(12) United States Patent
Echeverri

(10) Patent No.: US 8,702,996 B2
(45) Date of Patent: Apr. 22, 2014

(54) THICKENER/CLARIFIER FEEDWELL HAVING VOLUTE PERIPHERIES

(75) Inventor: Luis Echeverri, Tucson, AZ (US)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 13/878,699

(22) PCT Filed: Oct. 14, 2011

(86) PCT No.: PCT/US2011/056369
§ 371 (c)(1),
(2), (4) Date: Apr. 10, 2013

(87) PCT Pub. No.: WO2012/051536
PCT Pub. Date: Apr. 19, 2012

(65) Prior Publication Data
US 2013/0193088 A1    Aug. 1, 2013

(51) Int. Cl.
*B01D 21/24*    (2006.01)

(52) U.S. Cl.
CPC ........ *B01D 21/2411* (2013.01); *B01D 21/2427* (2013.01)
USPC ........ 210/788; 210/801; 210/519; 210/532.1; 210/541

(58) Field of Classification Search
USPC .............. 210/787, 788, 801, 519, 528, 532.1, 210/541
See application file for complete search history.

(56) References Cited

U.S. PATENT DOCUMENTS

| 1,104,051 | A | * | 7/1914 | Kropp ........................... 210/519 |
| 3,006,474 | A | | 10/1961 | Fitch |
| 3,067,878 | A | | 12/1962 | Genter et al. |
| 4,451,367 | A | | 5/1984 | Ruggeri |
| 2009/0173701 | A1 | | 7/2009 | Egan, III |
| 2010/0187191 | A1 | * | 7/2010 | Triglavcanin ................. 210/519 |
| 2011/0079563 | A1 | * | 4/2011 | Triglavcanin et al. ........ 210/519 |
| 2011/0132850 | A1 | * | 6/2011 | Lake et al. .................... 210/801 |

OTHER PUBLICATIONS

International Search Report and written opinion dated Feb. 29, 2012, 11 pages.

* cited by examiner

*Primary Examiner* — Christopher Upton
(74) *Attorney, Agent, or Firm* — Jeffrey A. Sharp; Aaron M. Pile; Richard M. Edge

(57) ABSTRACT

A feedwell for a thickener/clarifier includes a feedwell body (40), a feedwell inlet (41), a sidewall (42), and a discharge opening (48). At least one infeed conduit (21) is connected at an upstream end of the feedwell inlet (41). The sidewall (42) has a non-cylindrical curved peripheral surface defining a radially-outermost fluid boundary surface for an influent stream (60). The non-cylindrical curved peripheral surface may include portions of a volute surface, coil surface, helical surface, compound curve surface, spline curve surface, or spiral surface. Feedwells according to the invention provide a uniform settling tank feeding flux around exiting portions of the feedwell, control velocity gradients and shear rates, protect flocculated aggregates, normalize sedimentation conditions in the settling tank, and prevent large local accelerations and flow non-uniformities.

22 Claims, 24 Drawing Sheets

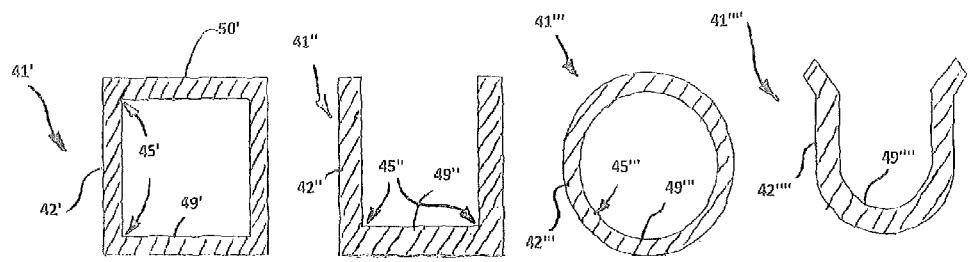
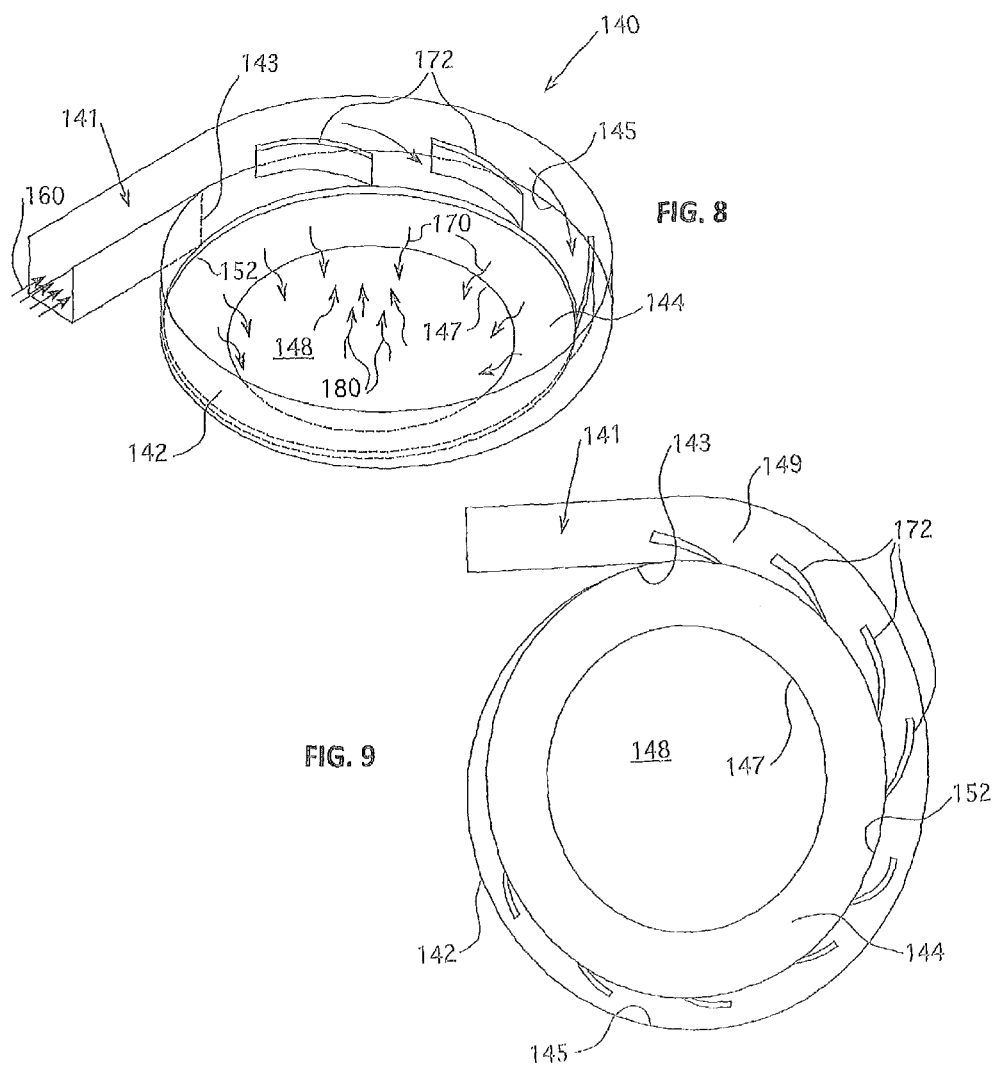

US 8,702,996 B2

THICKENER/CLARIFIER FEEDWELL HAVING VOLUTE PERIPHERIES

BACKGROUND OF THE INVENTION

This invention relates to sedimentation systems used to separate liquid and solid components of a feed slurry and more specifically relates to feedwell apparatus employed in thickener/clarifier tanks.

Thickener/clarifier tanks are used in a wide variety of industries to separate feed slurry comprising a solids or particulate-containing fluid to produce a "clarified" liquid phase having a lower concentration of solids than the feed slurry and an underflow stream having a higher concentration of solids than the feed slurry. Thickener/clarifier tanks conventionally comprise a settling tank having a floor and a continuous wall, which define a volume within which the clarification process takes place. Thickener/clarifier tanks also include an influent feed pipe for delivering an influent feed stream to the tank, an underflow outlet for removing settled solids from the tank, and a fluid discharge outlet for directing clarified liquid away from the tank. Thickener/clarifier tanks may also include a rake assembly having rake arms for sweeping along the floor of the tank, and may include an overflow launder or bustle pipe for collecting clarified liquid near the top of the tank.

Thickener/clarifier tanks of the type described operate by introducing an influent feed stream into the volume of the tank where the influent is retained for a period long enough to permit the solids to settle out by gravity from the fluid. The solids that settle to the bottom of the tank produce a sludge bed near the bottom of the tank, which is removed through the underflow outlet. Clarified liquid is formed at or near the top of the thickener/clarifier tank and is directed away from the tank for further processing or disposal. Settling of solids may be enhanced in some applications by the addition of a flocculant or polymer that forms agglomerates that settle more rapidly. In many applications, an objective of fluid clarification is to enhance the settling process to achieve a high throughput of solids, and thereby enhance solids recovery.

Many thickener/clarifier tanks are constructed with a feedwell, usually centrally located within the tank, into which the influent feed stream is delivered. The feedwell generally serves the purpose of reducing the fluid velocity of the incoming influent feed stream so that the energy in the stream may be dissipated to some degree before entering the tank. Dissipation of energy in the influent feed stream lessens the disruptive effect that the incoming influent feed has on the settling rate of the solids in the tank. In other words, introduction into a thickener/clarifier of an influent feed stream under high fluid velocity tends to cause turbulence in the tank and compromises the settling rate of solids. A feedwell may be structured in a variety of ways, therefore, to create or enhance dissipation of energy in the influent feed. See, e.g., U.S. Pat. No. 3,006,474 to Fitch, and U.S. Pat. Pub. No. 2009/0173701 to Egan, III.

Fluid flow analysis of conventional feedwells suggests that there are areas of high fluid velocity present where an influent feed stream tangentially intercepts and disrupts the constrained vertical fluid flow within central portions of the feedwell. Consequently, localized high shear rates and flow non-uniformities are found in these areas. Such high shear rates and non-uniformities generally create uneven distributions of mixture discharging from the feedwell, particularly as the diameter of the feedwell increases and the aspect ratio of the feedwell changes. These problems may be attributed to discrete feeding of influent streams through one or more localized entrances, where tangential feedpipes project streams that sharply disrupt the constrained vortex within the feedwell.

Several attempts have been proposed to improve the distribution of flow within conventional feedwells. For example, obstructing elements and orifices have been provided in order to promote a better distribution due to the effect of friction or pressure drops associated with the boundary layers and high shear rates. However, such solutions rely on friction, and therefore, may require extra pumping power or fluid potential energy to overcome frictional losses. Moreover, such solutions have limited ranges of operability.

FIGS. 20-23, 26, and 28 illustrate some of the problems associated with conventional tangential inlet feedwells. FIG. 20 shows a thickener/clarifier tank comprising a conventional tangential inlet feedwell having a circular or cylindrical shape. A sludge raking structure 10 is supported for rotation upon a center pier 11, or from a bridge drive (not shown). A drive mechanism 12 of any suitable known construction is mounted atop the pier, or from a bridge, providing the driving torque for the rake structure 10. In this particular embodiment, the pier 11 also supports the inner end of an access bridge 13, while some thickener mechanisms are bridge mounted.

Rake structure 10 comprises a central vertical cage 14 surrounding the pier, and rake arms of girder-like construction extending rigidly from the cage. Rake structure 10 has one pair of long rake arms 15, 16 opposite to one another, and, if required, a pair of short rake arms 17, 18 disposed at right angles thereto, all arms having sludge impelling or conveying blades 19 fixed to the underside thereof.

Rake structure 10 operates in a settling tank 20 to which a feed suspension, feed pulp, or slurry stream 2060 is supplied through feed pipe or infeed conduit 21. Infeed conduit 21 terminates in a feedwell 2040 having a cylindrical body 2042 which surrounds the top end portion of the rake structure 10 and is supported by pier 11.

Tank 20 may be of usual construction, comprising a bottom 24 of shallow inverted conical inclination, and formed with an annular sump 25 around the pier, to which settled solids or sludge are conveyed by rake structure 10. Scraper blades 26, unitary with rake structure 10 and substantially conforming to the profile of sump 25, move the collected sludge to a point of delivery from the sump, as by way of a discharge pipe 27.

Infeed conduit 21 is generally connected upstream of feedwell 2040, although the infeed conduit 21 could simply extend to or over the feedwell 2040 to deliver the slurry stream 2060 thereto. Feedwell 2040 has an annular shelf 2049 (FIG. 21) with an inner edge 2047 defining a circular discharge opening 2048 and a circular outer edge 2045 contiguous with a cylindrical sidewall 2042 of the feedwell. Infeed conduit 21 is connected to the feedwell 2040 via a feedwell inlet 2041 so as to deliver slurry stream 2060 tangentially to a circular path inside the feedwell along the cylindrical sidewall 2042. Infeed conduit 21 or feedwell inlet 2041 may incorporate an eductor structure including a nozzle extending into an open or closed channel for diluting the slurry stream 2060 with clarified liquid from the surrounding thickener/clarifier settling tank 20, via a momentum transfer or eduction process (see for example, U.S. Pat. Nos. 5,893,970 and 5,389,250).

Turning now to FIG. 22a, vertical discharge velocities for a conventional tangential inlet feedwell 2040 having a cylindrical sidewall 2042 are shown. As slurry stream 2060 moves through inlet 2041, past a point of intersection 2043, and along the annular shelf 2049 and cylindrical sidewall 2042, fluid passes through discharge opening 2048 and non-uniformly discharges into tank 20. In the particular embodiment shown, computational fluid dynamic (CFD) analysis was performed assuming a medium-sized feedwell approximately 6 meters in diameter with an inlet flow velocity of approximately 1.8 m/s, a settling velocity of approximately 20 m/h, and approximately 12% by weight flocculated solids in water, wherein the flocculated solids are approximately 2 mm in diameter. Vertical flow velocities are seen to be highest during the first 90 degrees of travel around the feedwell 2040. As shown, a crescent-shaped area 2102 of infeed discharges strongly downward at approximately 1.0-1.5 m/s into settling tank 20, adjacent the inner edge 2047 of discharge opening 2048. Such high velocities may cause flocculated particle breakdown, disrupt sediment resting at the bottom 24 of settling tank 20, or unevenly distribute flocculated particles circumferentially around the tank 20 which may lead to a decrease in overall efficiency of the thickener/clarifier and potentially overload the rake drive mechanism 12. A second non-uniform annular band 2104 of fluid located radially inwardly of area 2102 and inner edge 2047 discharges at a slightly lesser downward velocity of approximately 0.5-1.0 m/s into settling tank 20. A third non-uniform annular band 2106 of fluid located radially inwardly of area 2104 discharges downward into the settling tank 20 at an even lesser rate, between 0.5 and zero m/s. A large central region 2108 within a majority of opening 2048 occupies fluid that moves slowly upward, away from the bottom 24 of tank 20 with velocities up to 0.5 m/s.

FIG. 22b shows velocity vectors 2010 exiting a bottom portion of the feedwell 2040 adjacent inner edge 2047. As shown, an area 2074 of higher fluid velocity discharge is apparent during the first 180 degrees of vertical flow, and an area 2072 of lesser fluid velocity discharge is apparent during the latter 180 degrees of vertical flow. FIG. 22c shows a region of increased acceleration 2082 as the influent stream passes from inlet 2041 into the feedwell 2040, and an increased fluid velocity zone 2084 adjacent the inner edge 2047 during the first 90 degrees of vertical flow. FIG. 22d further shows region of increased acceleration 2082 and increased fluid velocity zone 2084 shown in FIG. 22c.

Turning now to FIG. 23a, attempts have been made to "deflect" strong initial downward fluid velocities in tangential inlet feedwells similar to the one exemplified in FIGS. 22a-c by incorporating a chord structure 2144 spanning two points along the inner edge 2147 of the annular shelf 2149. However, as shown, CFD analysis suggests that as slurry stream 2160 moves through inlet 2141, past intersection 2143, and along both the annular shelf 2149 and cylindrical sidewall 2142, fluid passes through circular opening 2148 and discharges into the tank 20 non-uniformly. Moreover, the structure 2144 reduces both the perimeter and area of discharge opening 2148, and increases the number of localized fluid accelerations. In the particular embodiment shown in FIG. 23a, CFD analysis was again performed assuming a medium-sized feedwell approximately 6 meters in diameter with an inlet flow velocity of approximately 1.8 m/s, a settling velocity of approximately 20 m/h, and approximately 12% by weight solids in water, wherein the flocculated solids are approximately 2 mm in diameter. Vertical velocities are shown to be highest in areas 2102, 2104 adjacent the first 90 degrees of travel around the feedwell 2140 past the chord structure 2144, and also in areas 2102, 2104 adjacent corners defined between the straight inner edge 2147b of the chord structure 2144 and the circular inner edge 2147a of opening 2148. In areas 2102, fluid discharges strongly downward at approximately 1.0-1.5 m/s into settling tank 20. Such velocities may cause flocculated particle breakdown, disrupt sediment resting at the bottom 24 of settling tank 20, or unevenly distribute flocculated particles circumferentially around the tank 20, which may reduce the efficiency of the thickener/clarifier. In areas 2104, fluid discharges into settling tank 20 at a slightly lesser downward velocity of approximately 0.5-1.0 m/s. In area 2106, fluid discharges downward into the settling tank 20 at an even lesser rate, between 0.5 and zero m/s. A large central region 2108 occupying a majority of opening 2148 contains fluid that may be static or may move slightly upward, away from the bottom 24 of tank 20 at velocities up to 0.5 m/s.

FIGS. 26 and 28 show non-uniform radial flows associated with conventional tangential inlet feedwells 2040, 2140 having cylindrical sidewalls 2042. The figures shown are time-lapse photos from scaled down dye-tests taken at 5 second, 10 second, and 20 second intervals, respectively, from left to right. As shown in FIG. 26, at a flow rate of approximately 0.04 cubic meters per hour, a majority of discharge 70 generally moves toward and settles in one quadrant of a settling tank 20. Similarly, as shown in FIG. 28, at a flow rate of approximately 0.09 cubic meters per hour, a majority of discharge 70 generally stays contained within only about half of the settling tank 20. This uneven distribution of discharge may reduce settling times and a decrease in overall efficiency.

OBJECTS OF THE INVENTION

It is, therefore, an object of the present invention to provide an improved feedwell for thickener/clarifiers.

It is also an object of the present invention to provide a feedwell which yields a more uniform distribution of discharge within a settling tank in order to improve the efficiency of a thickener/clarifier.

Moreover, an object of the present invention is to provide an improved method for operating a thickener/clarifier in a sedimentation system.

Yet another object of the present invention is to prevent stir-up of sediment and suspended particulates within a thickener/clarifier tank.

Another object of the present invention is to provide a feedwell which prevents flocculant breakdown.

Yet even another object of the present invention is to provide a more even and uniform distribution of discharge, such that each of the vertical fluid velocity vector components of the discharge are relatively similar in magnitude both circumferentially and concentrically around the edge of a central discharge opening in a feedwell.

Yet even another object of the present invention is to provide a more even and uniform distribution of discharge, such that each of the radial fluid velocity vector components of the discharge are relatively similar in magnitude both circumferentially and concentrically around the edge of a central discharge opening in a feedwell.

Yet even another object of the present invention is to provide a more even and uniform distribution of discharge, such that each of the tangential fluid velocity vector components of the discharge are relatively similar in magnitude both circumferentially and concentrically around the edge of a central discharge opening in a feedwell.

Another object of the present invention is to provide a smooth and progressive fluid transition between an inlet pipe delivering an influent feed stream and a thickener/clarifier settling tank.

Furthermore, it is an object of the present invention to eliminate localized fluid accelerations which are observed with conventional tangential inlet feedwells.

It is also an object of the present invention to reduce maximum discharge fluid velocities.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A feedwell for a thickener/clarifier comprises, in accordance with the present invention, a feedwell body, a sidewall, a feedwell inlet, and a discharge opening. The sidewall defines a radially-outermost fluid boundary surface for an influent stream and comprises one or more portions of a volute, a helix, a coil, a compound curve, a spline curve, or a spiral. For example, the curved fluid boundary surface may include one or more portions of a transition spiral, a clothoid (Euler) spiral, or an arithmetic (Archemedian) spiral, without limitation. Alternatively, for ease of manufacturing, the curved fluid boundary surface may comprise a curved surface defined by a plurality of joined arcs having different radii and/or arc centers as will be described hereinafter. Even more alternatively, the curved fluid boundary surface may be approximated with a plurality of planar facet surfaces joined together and approximating a curved surface (e.g., Spiral of Thodorus). The feedwell may further comprise a shelf extending radially-inwardly from said sidewall of the feedwell body between an outer edge and an inner edge. A width of the shelf generally decreases as the shelf extends circumferentially around the feedwell body, until the shelf terminates at a point where the outer edge intersects the inner edge. The shelf may extend between 0 and 360 degrees around the feedwell body, and in some instances 90, 180, or 270 degrees around the feedwell body. In some embodiments, the shelf may extend more than 360 degrees around the feedwell body.

In some embodiments, multiple shelves may be provided, wherein the shelves are axially spaced from each other in relation to a central axis. The shelves may extend in the same rotational direction to support flows in the same direction, or the shelves may extend in opposite rotational directions to support counter-rotating flows. Shelves may extend between 0 and 360 degrees around the feedwell body, and in some instances, may extend approximately 90, 180, or 270 degrees around the feedwell body. In some instances, the shelves may extend more than 360 degrees around the feedwell body. A radial position of a sidewall (with respect to a central axis of the feedwell) may change in constant or non-constant relationship with respect to an angle of rotation about said central axis. In some embodiments, spill lips and/or flow control structures may be provided to the feedwell. Moreover, one or more openings may be provided in portions of the feedwell body in order to assist with dilution of incoming feed, and one or more inlet ports and channels or spargers may be provided to introduce flocculant material to the feedwell.

A method for providing a uniform distribution of discharge from a feedwell within in a thickener/clarifier is also disclosed. The method comprises, in accordance with the present invention, providing a feedwell having a feedwell body, a sidewall, a feedwell inlet, and a discharge opening, wherein the sidewall is curved and comprises one or more portions of a volute surface, a helical surface, a coil surface, a compound curve surface, a spline curve surface, and/or a spiral surface. The method further comprises flowing an influent stream through said feedwell inlet, and, by virtue of the shape, configuration, and disposition of said sidewall, reducing the number of areas of high localized fluid accelerations and high localized fluid velocities within and around the discharge opening of the feedwell.

In some embodiments, A kit may be provided, wherein the kit comprises, in accordance with the present invention, at least one sidewall for replacing a circular or cylindrical radially-outermost fluid boundary surface of a conventional feedwell, wherein the sidewall comprises at least one of a volute surface, a helical surface, a coil surface, a compound curve surface, a spline curve surface, or a spiral surface. The kit may be a feedwell retrofit kit for modifying an existing conventional feedwell body. Modification steps may comprise cutting and/or unbolting portions of an existing feedwell body. Modification steps may also include attaching the sidewall of the kit to the modified feedwell which may be carried out using welding and/or bolting techniques.

BRIEF DESCRIPTION OF THE DRAWINGS

FIGS. 7a-7d schematically illustrate cross-sectional end views of some non-limiting examples of feedwell inlets according to some embodiments;

FIG. 8 show a feedwell similar to the one shown in FIGS. 1-6, further comprising one or more flow modifying structures such as vanes or baffles;

FIG. 9 is a top plan view of the feedwell shown in FIG. 8;

DETAILED DESCRIPTION OF THE INVENTION

Figure 1:
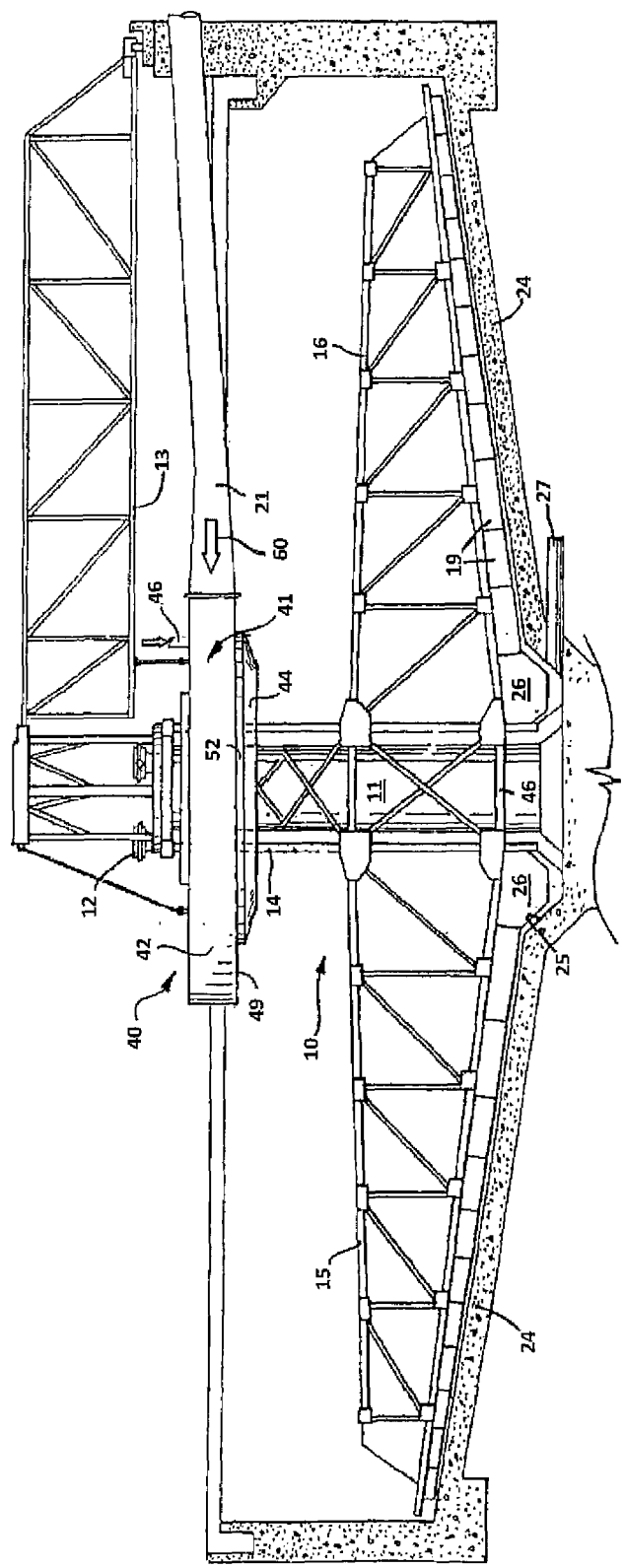
FIG. 1 shows a vertical sectional view of a thickener/clarifier unit in a sedimentation system, comprising a feedwell according to some embodiments.
Figure 2:
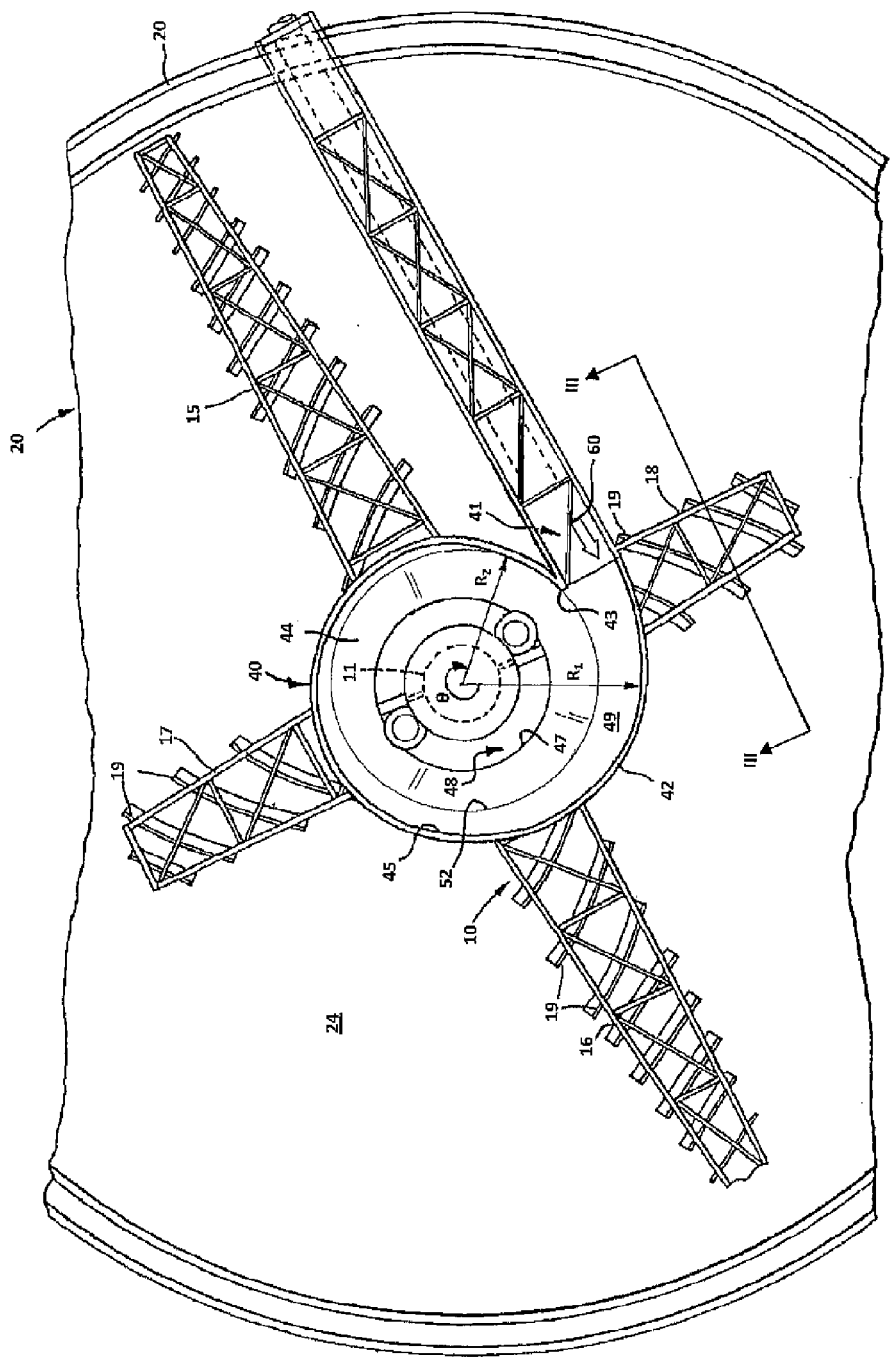
FIG. 2 shows a top plan view of the thickener/clarifier tank of FIG. 1.
Figure 3:
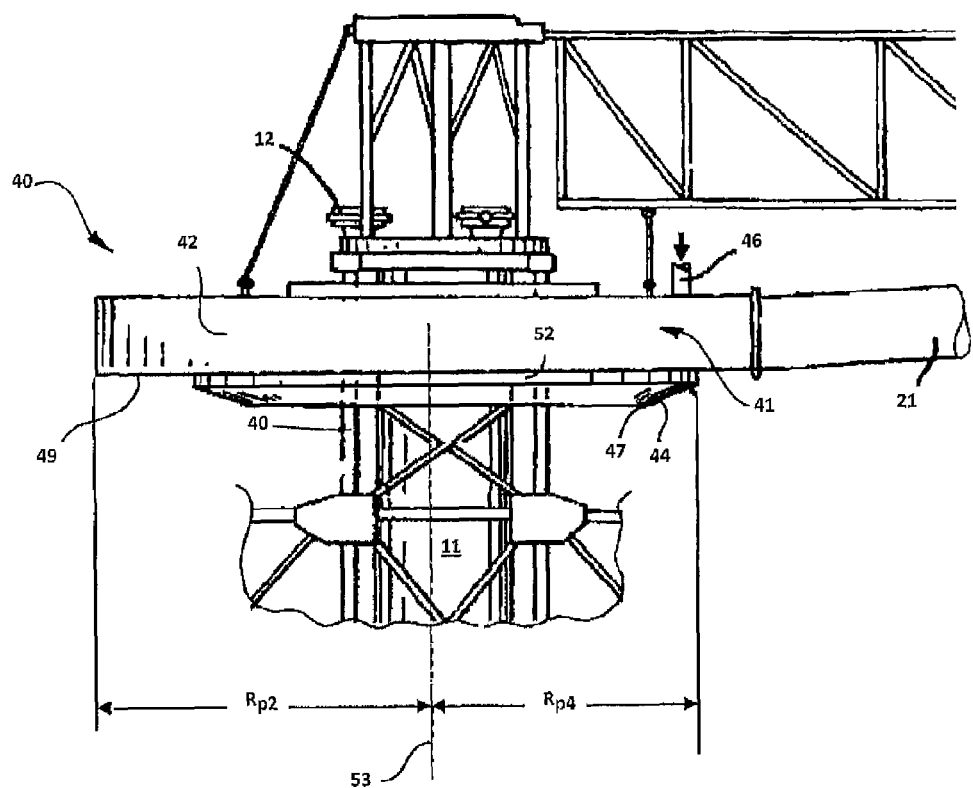
FIG. 3 shows a partial vertical sectional view of the thickener/clarifier tank of FIG. 2, taken on line in FIG. 2.

As illustrated in FIGS. 1 and 2, a thickener/clarifier comprises a continuously operating settling tank 20 wherein a sludge raking structure 10 is supported for rotation upon a center pier 11, or from a bridge drive (not shown). A drive mechanism 12 of any suitable known construction is mounted atop the pier, or from a bridge, providing the driving torque for the rake structure 10. In this particular embodiment, the pier 11 also supports the inner end of an access bridge 13, while some thickener mechanisms are bridge mounted.

Rake structure 10 comprises a central vertical cage portion or cage 14 surrounding the pier, and rake arms of girder-like construction extending rigidly from the cage. Rake structure 10 has one pair of long rake arms 15 and 16 opposite to one another, and, if required, a pair of short rake arms 17 and 18 disposed at right angles thereto, all arms having sludge impelling or conveying blades 19 fixed to the underside thereof.

Rake structure 10 operates in the settling tank 20 to which an influent feed suspension, pulp, or slurry 60 is supplied through feed pipe or infeed conduit 21. Conduit 21 is joined to feedwell 40 via an inlet 41. The feedwell 40 comprises a sidewall 42 having one or more curved, non-cylindrical peripheral surfaces. The curved, non-cylindrical peripheral surfaces may extend between 0 and 720 degrees of angular rotation around the feedwell 40, but could extend for greater than 720 degrees of angular rotation around the feedwell 40. Preferably, the curved, non-cylindrical peripheral surfaces extend between 180 and 540 degrees around the feedwell 40, and more preferably, extend approximately 360 degrees around the feedwell 40. In some preferred embodiments, the curved, non-cylindrical peripheral surfaces may extend approximately 90, 180, or 270 degrees around the feedwell 40. The curved, non-cylindrical peripheral surfaces may include, for example, portions of an extruded coil. Inner portions of sidewall 42 define radially-outermost fluid boundary surfaces which are configured to guide an influent stream 60 which enters the feedwell 40 at a greater radial distance than where an effluent stream 70 discharges from the feedwell 40. In other words, a distance between the sidewall 42 and the center of discharge opening 48 generally changes as a function of polar angle relative to a central axis 53 of the feedwell 40. As shown, an outermost peripheral flow surface (defined by an internal surface of sidewall 42) may be located a distance $R_1$ from the central axis 53 of the feedwell adjacent the feedwell inlet 41. However, at a circumferential distance further from the feedwell inlet 41, an outermost peripheral flow surface may be located a lesser distance $R_2$ from the central axis 53 of the feedwell, where $R_1$ is greater than $R_2$.

Where described herein, terms such as "curved", "non-circular", "non-cylindrical", and "volute" may include, without limitation, surfaces containing one or more volute surfaces, helical surfaces, curled surfaces, whorled surfaces, coiled surfaces, compound curve surfaces, spline curve surfaces, parametric surfaces, and/or spiral surfaces. For example, spiral surfaces may include one or more portions of a transition spiral, a clothoid (Euler) spiral, a logarithmic spiral, a Fermat spiral, a hyperbolic spiral, or an arithmetic (Archemedian) spiral, without limitation. For ease of manufacturing, non-cylindrical curved surfaces described herein may be approximated with one or more compound curve surfaces defined by a plurality of joined arcs having different radii and/or arc centers as will be described hereinafter. Even more alternatively, for ease of manufacturing, the non-cylindrical curved surfaces described herein may be approximated with a plurality of planar or non-planar facets joined to approximate a curved surface (e.g., Spiral of Thodorus) as will be described hereinafter. It should be noted that changes in the distance of the sidewall 42 from the center of the feedwell 40 may be constant or non-constant with respect to changes in angle θ, and that the cross-sectional shape of sidewall 42 may be straight (as shown), curved, stepped, rounded, or undulating without limitation. While not shown, the cross-sectional shape of sidewall 42 may also change as the sidewall 42 progresses around the feedwell.

The feedwell 40 and its sidewalls 42 generally surround the top end portion of the rake structure 10 and are supported by pier 11. Tank 20 may be of usual construction, comprising a bottom 24 of shallow inverted conical inclination, and formed with an annular sump 25 around the pier, to which settled solids or sludge are conveyed by rake structure 10. Scraper blades 26, unitary with rake structure 10 and substantially conforming to the profile of sump 25, move the collected sludge to a point of delivery from the sump 25, as by way of a discharge pipe 27.

Infeed conduit 21 is generally connected upstream of feedwell 40, although the infeed conduit 21 could simply extend to or over the feedwell 40 to deliver a slurry stream 60 thereto. Slurry stream 60 may include flocculant and or dilutent introduced via one or more inlet ports 46 communicating with infeed conduit 21 and/or the body of the feedwell 40. In some embodiments, feedwell 40 comprises a spiral-shaped shelf 49 (FIG. 2) bounded by an outer edge 45 and an inner edge 52. Feedwell 40 may also comprise an optional spill lip 44 between said inner edge 52 of the shelf 49 and the edge 47 of a centrally-located discharge opening 48. Spill lip 44 may be flat, sloped, stepped, rounded, or frustoconical as shown. Outer edge 45 is contiguous with non-cylindrical sidewall 42 and generally defines an intersection between the sidewall 42 and shelf 49. Outer edge 45 may be a sharp corner, a rounded corner 45a, or a chamfered corner 45b as exemplified in FIG. 6. As shown, the non-cylindrical sidewall 42 comprises a volute surface, a spiral surface, a helical surface, a coiled surface, a compound curve surface, a spline curve surface, or the like. Infeed conduit 21 is connected to feedwell 40 via a feedwell inlet 41, which is configured to direct and guide influent stream 60 along the non-cylindrical flow path provided by sidewall 42. Stream 60 may have a substantially circular inner boundary located generally above inner edge 47, for example, created by an outer surface of pier 11. In the particular embodiment shown, the inner 47 and outer 45 boundaries extend generally parallel to the path of the slurry stream 60, though they may be non-parallel in some embodiments. The sidewall 42 may intersect with a portion of the feedwell inlet 41 at a point of intersection 43.

The feedwell inlet 41 and sidewall 42 form a flow channel for influent slurry stream 60, the flow channel having a variable cross-sectional area that decreases circumferentially around the feedwell 40, to provide a uniform feeding flux peripherally around the feedwell 40. The uniform feeding flux controls velocity gradients and shear rates, protects flocculated aggregates that have been carefully produced upstream, and normalizes settling conditions within the thickener/clarifier. The unique shape of the feedwell 40 also optimizes tank 20 feeding by reducing flow accelerations and non-uniformities. Moreover, the non-cylindrical geometries of the sidewall 42 enable the feedwell 40 to operate consistently and efficiently under a wide variety of flow conditions, slurry material properties, and feedwell sizes.

As depicted in FIGS. 3-6, a feedwell 40 for a thickener/clarifier may be wider on a first side than on a second opposing side. For example, the feedwell may be asymmetric, having a first quarter radius $R_{p2}$ that is larger than a third quarter radius $R_{p4}$. Central regions of the feedwell may be symmetrical and smaller in diameter than other portions of the feedwell. Central regions of feedwell 40 may comprise a cylindrical step adjacent the inner edge 52 or an optional spill lip 44. Edge portion 52 and/or spill lip 44 may serve as an aperture for controlling discharge. Spiral shelf 49 may be generally planar as shown, or it may be twisted along its path. Moreover, while not shown, spiral shelf 49 may extend helically downward around the feedwell such that portions of the shelf 49 are axially-displaced from each other with respect to a central axis 53 of the feedwell.

Figure 4:
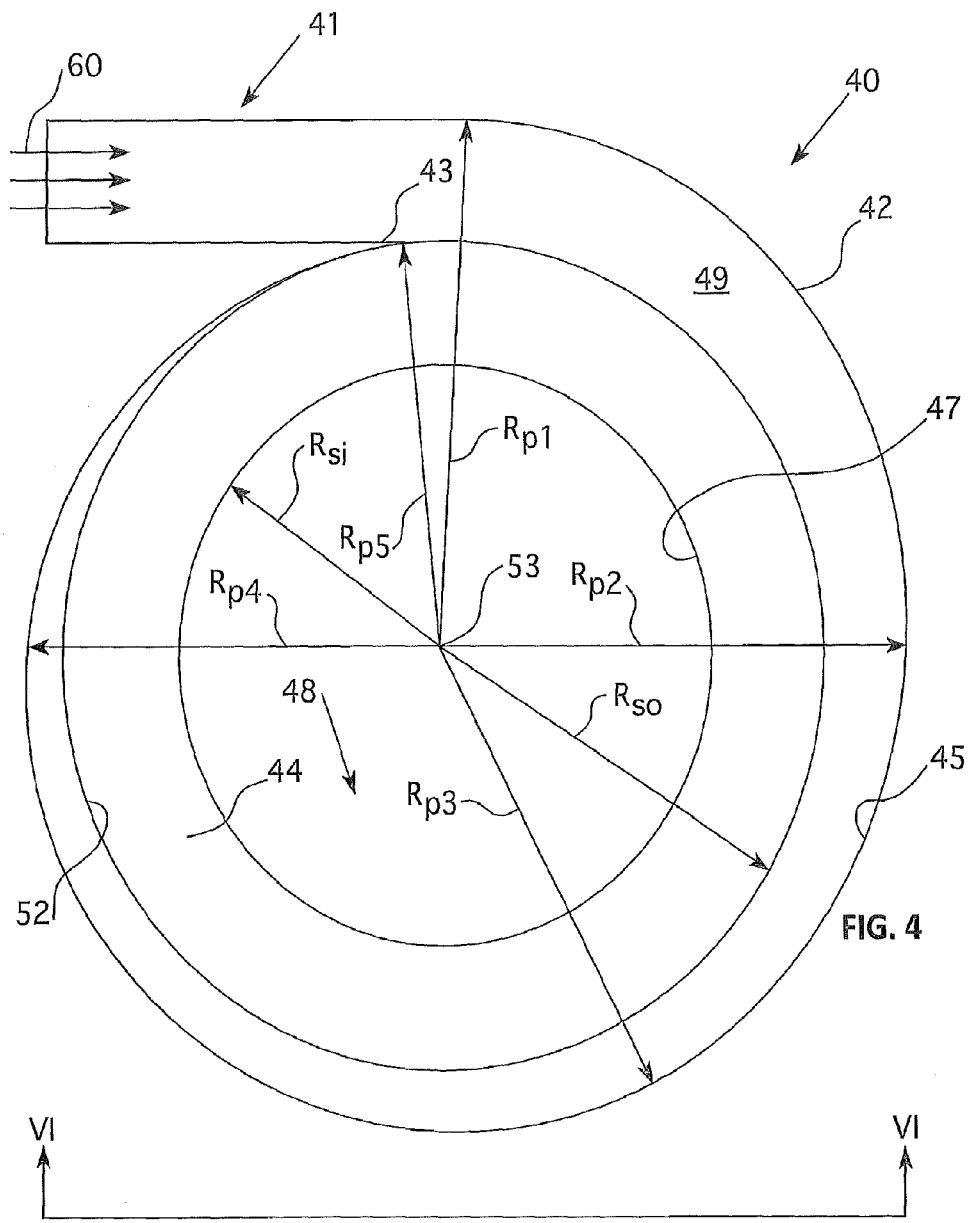
FIG. 4 is a detailed top plan view of the feedwell of FIGS. 1-3.

Turning now to FIG. 4, the inner edge 47 of the spill lip 44 which forms opening 48 may be provided with a generally constant radius $R_{si}$, and the outer perimeter of the spill lip 44 which intersects cylindrical body portion 52 may have a generally constant radius $R_{so}$. Incoming slurry 60 passes through inlet 41 initially having a maximum radial distance $R_{p1}$ from the central axis 53 of the feedwell 40. As slurry stream 60 progresses around the feedwell 40 and mixes with clarified liquid in upper regions of the settling tank 20, its maximum radial distance from the central axis 53 of the feedwell 40 gradually decreases to radial distances $R_{p2}$, $R_{p3}$, and $R_{p4}$ until the stream 60 approaches 360 degrees of angular rotation at a point of intersection 43, where the radial distance $R_{p5}$ of the stream 60 approximately equals the outer perimeter $R_{so}$ of spill lip 44.

Figure 5:
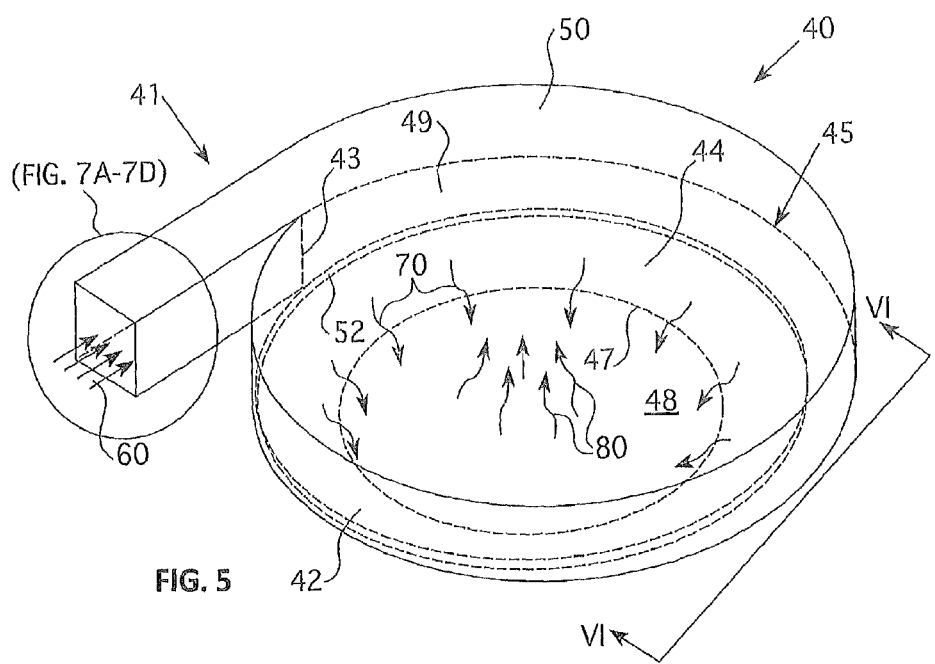
FIG. 5 is a top isometric view of the feedwell of FIGS. 1-4.
Figure 6:
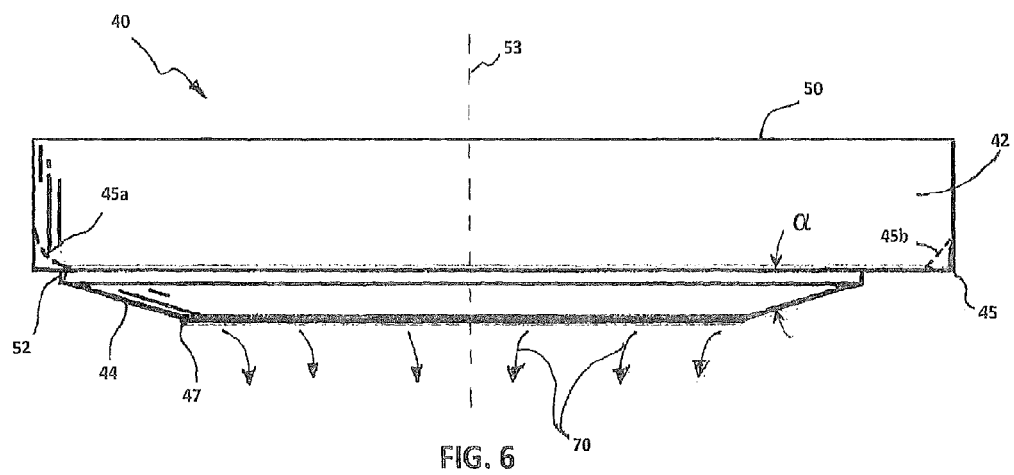
FIG. 6 is a side view of the feedwell of FIGS. 1-5, taken on line VI-VI in FIGS. 4 and 5.

As shown in FIGS. 5 and 6, an optional cover 50 may be provided to feedwell 40. During operation, the incoming slurry stream 60 swirls around inside portions of the feedwell, and mixes with clarified liquid as it spirals around sidewall 42. Once the energy of fluid in the feedwell 40 dissipates, discharge 70 uniformly exits the feedwell along the edge 47 of opening 48 and enters the settling tank 20. In more central portions of the feedwell, flow 80 may comprise neutral or slightly vertical components which help with mixing fluid from the tank 20 with the in feed 60. As previously stated, portions of outer edge 45 formed between the sidewall 42 and the spiral shelf 49 may be rounded 45a or chamfered 45b in order to prevent stagnation and flocculant/slurry build-up in corners. Optional spill lip 44 may be sloped by an angle α between 0 and 90 degrees, inclusive. In some instances, as shown in FIG. 6, the inclination angle α of spill lip 44 may be approximately 15 to 60 degrees, for example, 30 degrees.

FIGS. 7a-7c illustrate some non-limiting examples of cross-sectional profiles for a feedwell inlet 41', 41'', 41''', 41'''' according to some embodiments. In FIG. 7a, a four-sided inlet shape is provided, having a tubular square cross-section with a bottom wall 49', two sidewalls 42', an upper wall 50', and corner portions 45' interposed therebetween. In FIG. 7b, a three-sided inlet shape is provided, having a cross-section including a bottom wall 49'', two sidewalls 42'', and corner portions 45'' interposed therebetween. In FIG. 7c, a round inlet cross-sectional shape (e.g., circular or oval) is provided, including a bottom wall portion 49''' and a sidewall 42''' having smooth inner surfaces 45'''. In FIG. 7d, a U-shaped inlet shape is provided, including a bottom wall 49'''' and two sidewalls 42''''.

Figure 32:
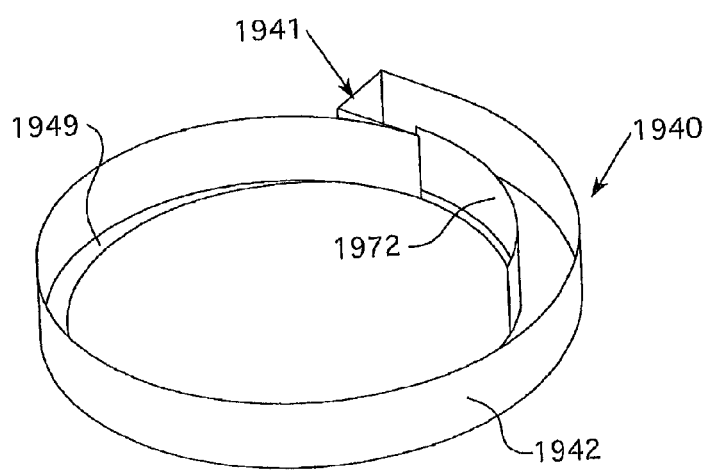
FIG. 32 shows an embodiment having a single flow control structure and no spill lip.

FIGS. 8 and 9 show a feedwell 140 according to other embodiments. The feedwell 140 shown is similar to the one shown in FIGS. 1-6; however, it further comprises the addition one or more flow control structures 172. The flow control structures 172 may be placed within the feedwell, in any particular number, geometry, or location to tailor flow for different circumstances. The flow control structures 172 may be permanently fixed to feedwell portions, or they may be removably attached to portions of the feedwell. Moreover, the flow control structures 172 may be held stationary with respect to other portions of the feedwell (e.g., welded or bolted thereto), or may be allowed to pivot or rotate relative to the feedwell according to some embodiments. In the particular embodiment shown, flow control structures 172 are provided on spiral shelf 149, though they may also be placed on or adjacent to portions of sidewall 142, edge portion 152, or spill lip 144. Flow control structures 172 may serve to help dissipate energy from incoming slurry feed 160 and/or direct centrifugal flow to central portions of the feedwell 140. Flow control structures 172 may comprise, for example, one or more fins, vanes, stators, rotors, rotor blades, free-spinning paddle wheels, straight blades, curved blades, ribs, channels, baffles, screens, shaped panels, or the like. A particular embodiment of a feedwell 1940 shown in FIG. 32 comprises a volute sidewall 1942, a planar or conical shelf 1949, and a single flow control structure 1972 extending from a feedwell inlet 1941 to an innermost portion of the shelf 1949.

Figure 10:
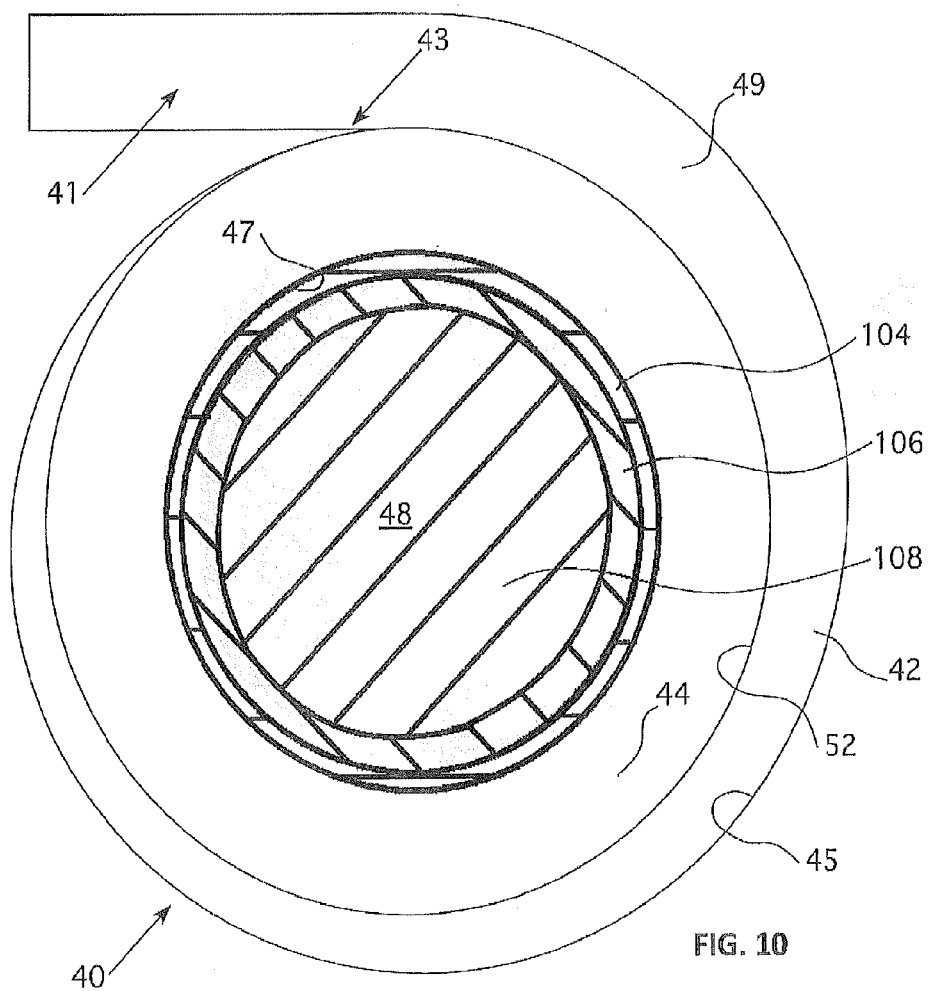
FIG. 10 is a bottom plan view of the feedwell of FIGS. 1-6 showing expected vertical discharge velocities.
Figure 11:
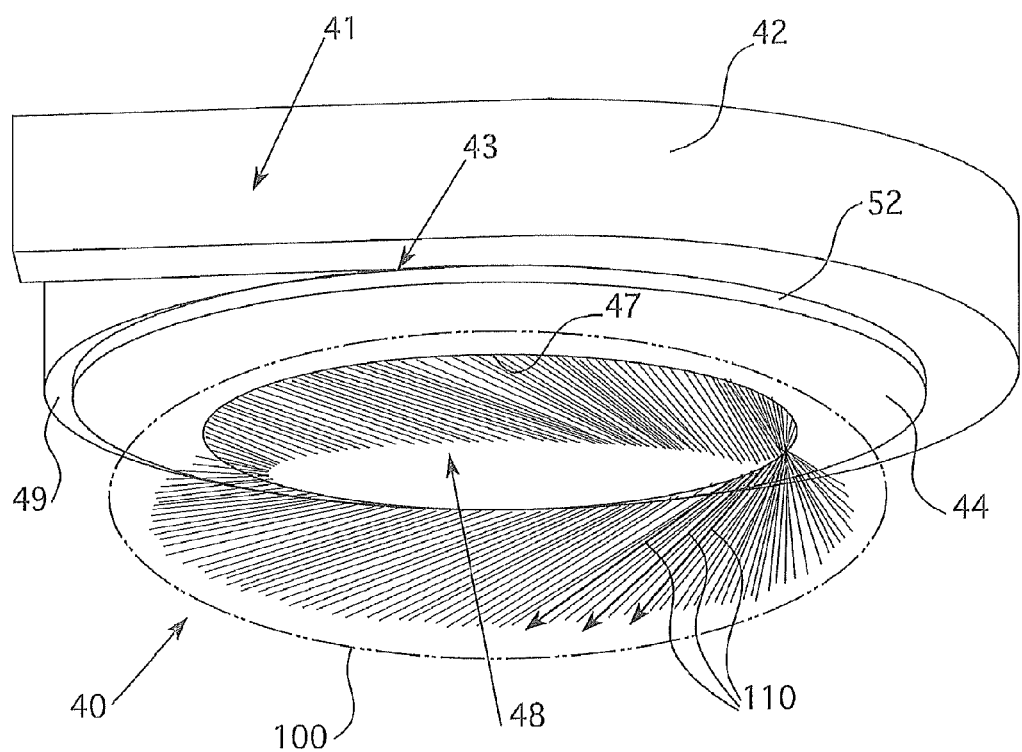
FIG. 11 is a bottom isometric view of the feedwell shown in FIGS. 1-6, which shows expected velocity vectors of discharge according to computational fluid dynamics (CFD) modeling.
Figure 22A:
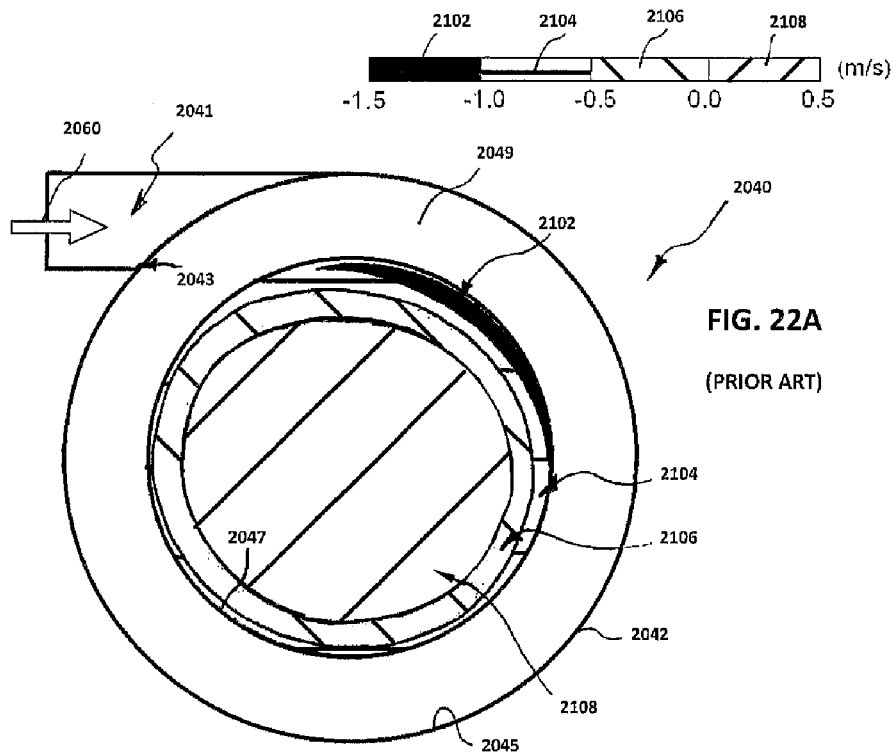
FIGS. 22a-22d show CFD analysis performed on the conventional tangential-feed cylindrical feedwell of FIGS. 20-21.
Figure 23A:
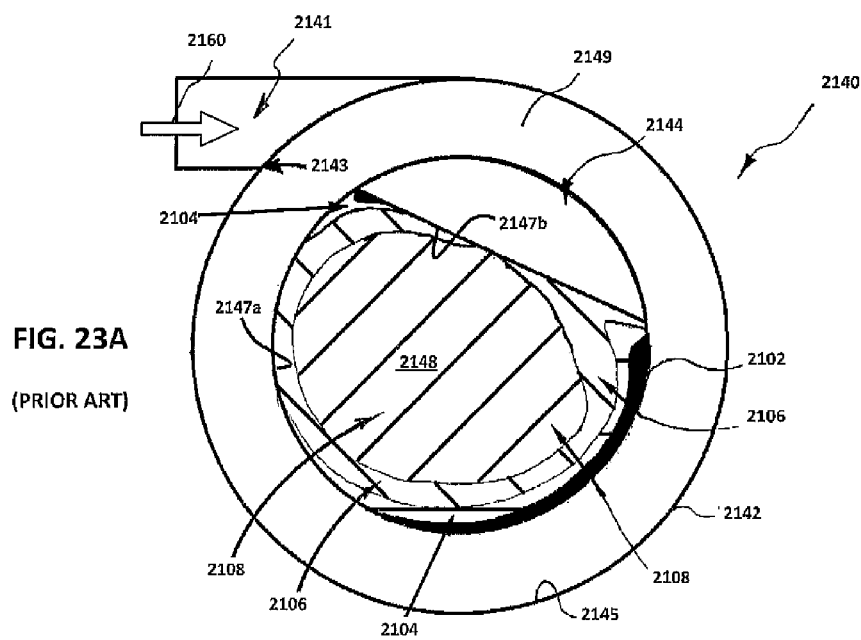
FIG. 23 shows CFD analysis performed on a conventional tangential-feed cylindrical feedwell comprising a chord.
Figure 22B:
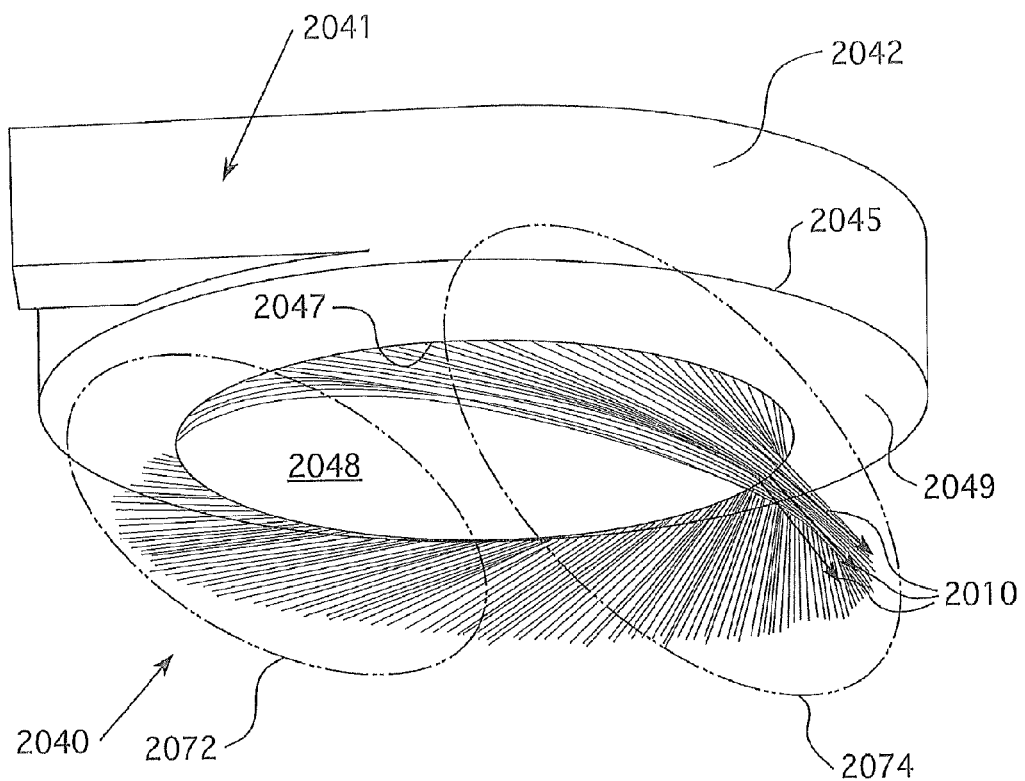
Figure 22C:
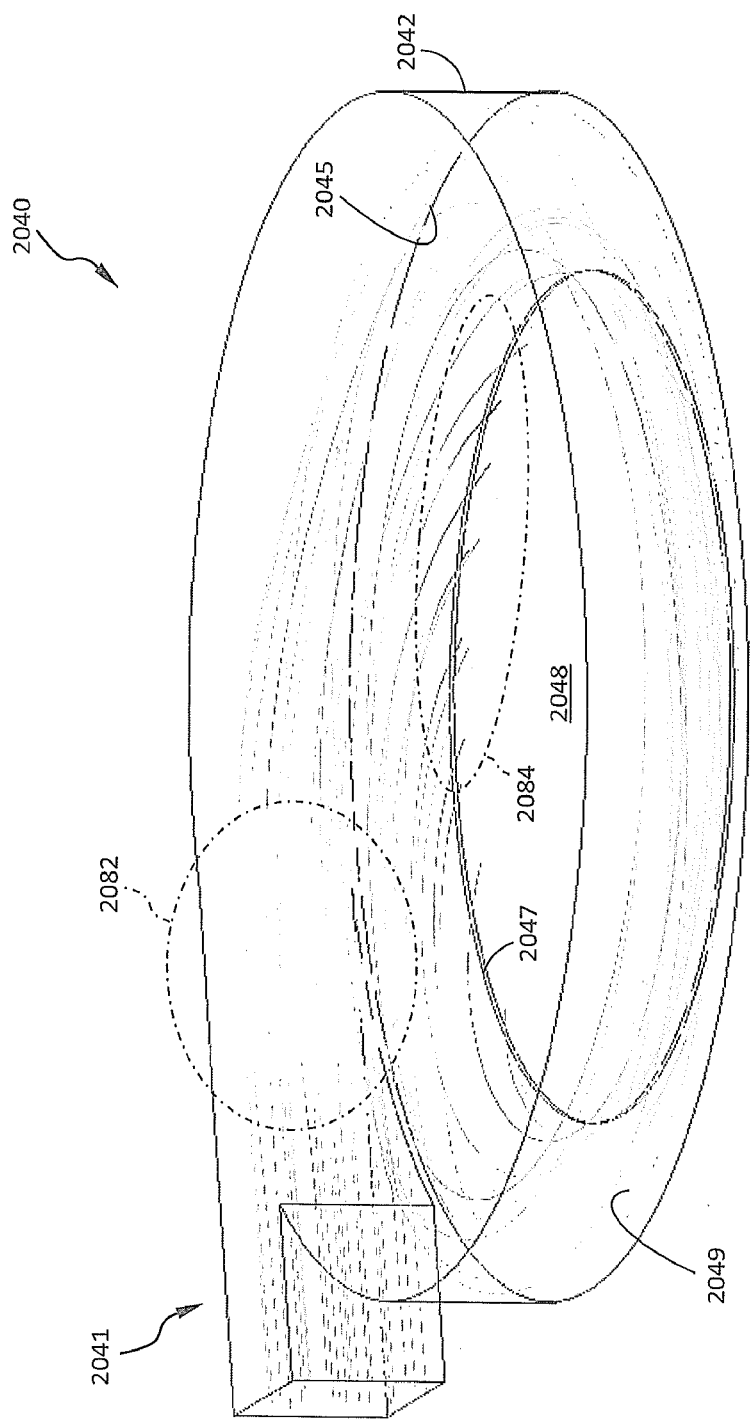
Figure 22D:
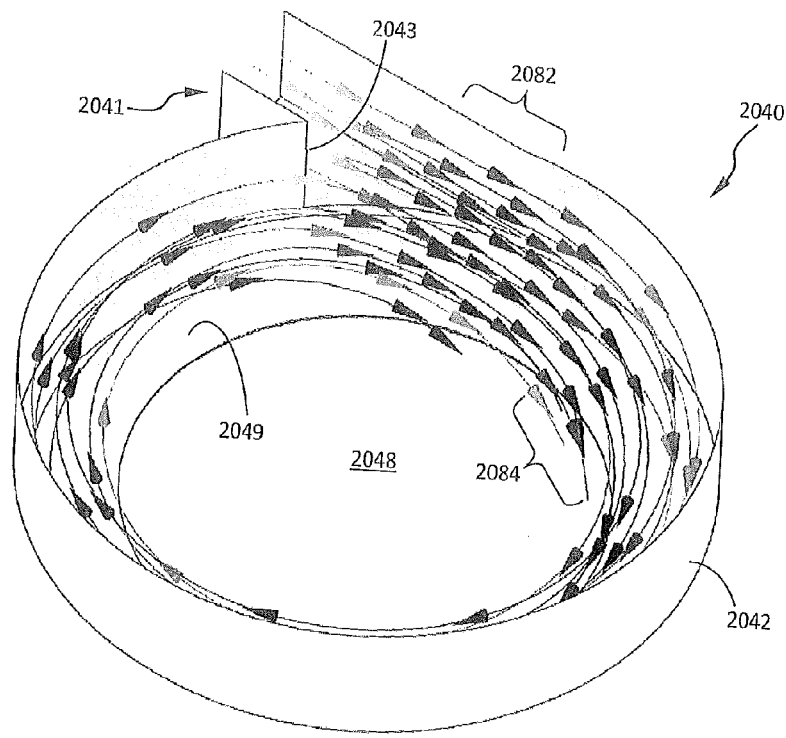
Figure 24:
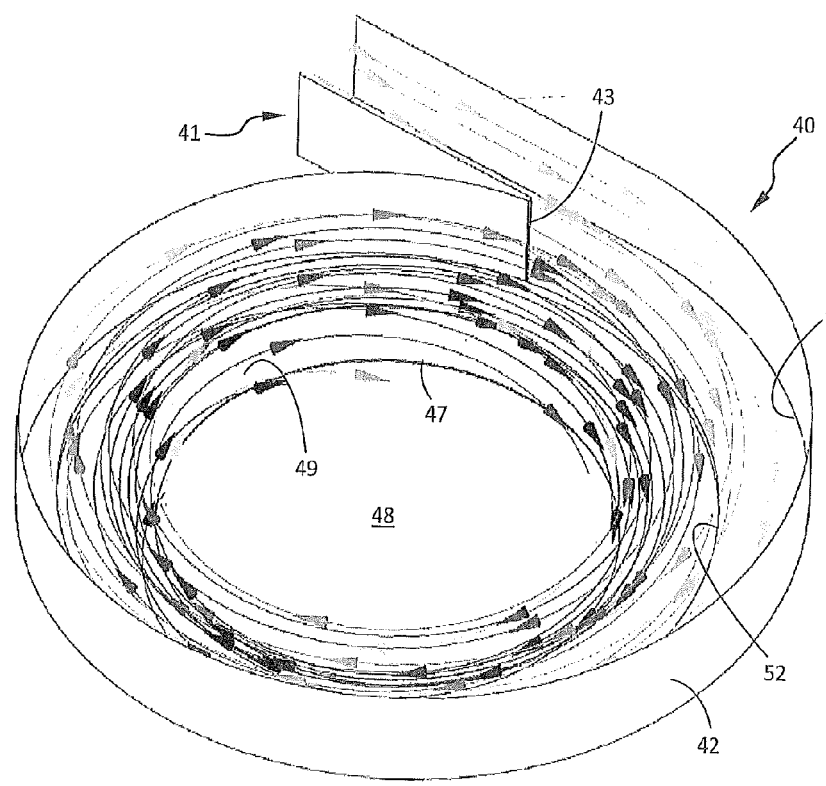
FIG. 24 shows fluid flow in a feedwell according to some embodiments, particularly showing elimination of localized high fluid velocities and accelerations.

Turning now to FIG. 10, the feedwell 40 shown in FIGS. 1-6 provides a very uniform distribution of discharge 70. A large annular band 104 of mixture which is most adjacent inner edge 47 comprises a downward vertical exit velocity of approximately 0.5-1.0 m/s. Annular band 106 of mixture comprises a more neutral downward vertical exit velocity of approximately 0-0.5 m/s. A large central region 108 of mixture comprises a neutral to slightly upward vertical exit velocity of approximately 0-0.5 m/s. One of ordinary skill in the art would appreciate that FIG. 10 suggests an even, concentrically-uniform distribution of discharge 70, and does not exhibit the higher localized 1-1.5 m/s downward vertical velocities exhibited by the conventional feedwells shown in FIGS. 22a and 23a, FIG. 11 compliments FIG. 10 by showing exit velocity vectors 110 at the discharge opening 148 of the feedwell 140. As shown, the vertical velocity magnitudes of the flow region 100 are uniform, thereby reducing areas of concentrated disruption within tank 20 and improving the overall efficiency of the thickener/clarifier. FIG. 24 further suggests reduced maximum flow velocities and a more uniform flow distribution.

Figure 12:
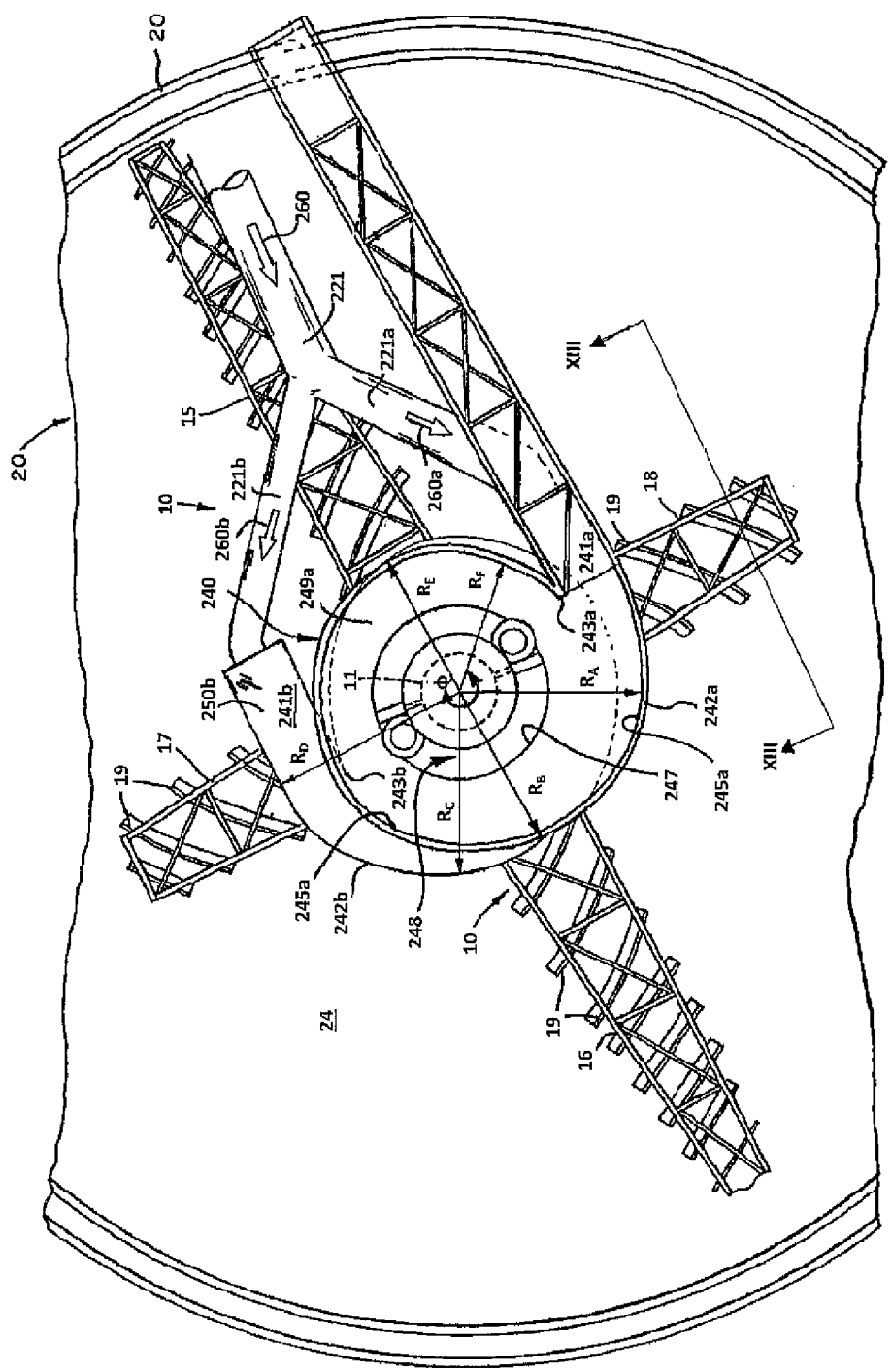
FIG. 12 shows a top plan view of a thickener/clarifier unit comprising a volute Fitch-type feedwell according to some embodiments, wherein volute peripheral structures extend 360-degrees around the feedwell.

FIG. 12 illustrates an embodiment comprising at least one non-cylindrical inlet structure 241a which extends in a clockwise fashion, and at least one non-cylindrical inlet structure 241b extending in a counter clockwise fashion. Feedwell 40 may be provided in a Fitch-type configuration. A feed suspension, pulp, or slurry 260 is supplied through feed pipe or infeed conduit 221 which splits into two infeed conduit sections 221a, 221b. Infeed conduit sections 221a, 221b terminate at feedwell inlets 241a, 241b at opposite sides of the feedwell. Each inlet 241a, 241b comprises sidewalk 242a, 242b having one or more curved, non-cylindrical peripheral surfaces. The curved, non-cylindrical peripheral surfaces may extend between 0 and 720 degrees around the feedwell, but preferably extend between 180 and 540 degrees around the feedwell, and more preferably, extend approximately 360 degrees around the feedwell as shown. In some embodiments, the curved, non-cylindrical peripheral surfaces may extend approximately 90, 180, or 270 degrees around the feedwell 40. The curved non-cylindrical peripheral surfaces may comprise portions of an extruded coil. The sidewalls 242a, 242b are generally provided near radially-outermost portions of the feedwell body such that influent streams 260a, 260b enter the feedwell 240 at greater radial distances ($R_A$, $R_D$) than where they exit the feedwell. The distance between the sidewalls 242a, 242b and the center of the feedwell 240 changes as a function of polar angle relative to central axis 253 of feedwell 240. In other words, outermost peripheral fluid boundary surfaces (defined by internal surfaces of sidewalls 242a, 242b) may be located a distance $R_D$ from the central axis 253 of the feedwell adjacent the feedwell inlets 241a, 241b, whereas, said surfaces may be located a distance $R_E$ from the central axis 253 of the feedwell farther from the inlet 241, where $R_D$ is greater than $R_E$. It should be noted that changes in the distance (e.g., $R_A$-$R_F$) of the sidewalk 242a, 242b from the center of the feedwell 240 may be constant or non-constant with respect to changes in angle Φ measured with respect to central axis 253. It should also be noted that one feedwell inlet 241b may be positioned axially lower than another feedwell inlet 241a, and therefore, the lower feedwell inlet 241b may comprise a top panel structure 250b to enclose the feedwell structure 40.

Infeed conduits 221a, 221b are generally connected upstream of feedwell 240, although the infeed conduits could simply extend to or over the feedwell 240 to deliver slurry streams 260a, 260b thereto. Slurry streams may include flocculant and or dilutent introduced via one or more inlet ports (not shown). Inlet ports may communicate with feedwell inlets 241a, 241b, sidewalls 242a, 242b, or infeed conduits 221a, 221b. Feedwell 240 includes a spiral-shaped shelf 249 having an inner edge 247 defining a discharge opening 248, and outer edges 245a, 245b which are contiguous with non-cylindrical sidewalls 242a, 242b of the feedwell 240. Outer edges 245a, 245b may form sharp corners, rounded corners (45a), or a chamfered corners (45b) as exemplified in FIG. 6. As shown, sidewalls 242a, 242b have flow surfaces comprising a volute, spiral, helical, coiled, compound curve, or spline curve shape. Infeed conduits 221a, 221b are connected to feedwell 240 via feedwell inlets 241a, 241b so as to deliver slurry streams 260a, 260b along the curved paths inside the body of the feedwell. The inner 247 and outer 245a, 245b edges may extend generally parallel to each other and the flow paths of the slurry streams 260a, 260b as shown. The sidewalls 242a, 242b may intersect feedwell inlets 241a, 241b at points of intersection 243a, 243b. In some embodiments, inlets 241a, 241b may be aligned so as to be parallel to one another as shown, or the inlets 241a, 241b may enter the feedwell 240 in non-parallel fashion.

Each of the feedwell inlets 241a, 241b form flow channels for slurry streams 260a, 260b. The flow channels have variable cross-sectional areas that decrease circumferentially around the feedwell 240, and provide uniform feeding fluxes peripherally around the circumference of feedwell 240. The uniform feeding fluxes control velocity gradients and shear rates, protect the flocculated aggregates that have been carefully produced upstream, and normalize settling conditions within the thickener/clarifier by optimally distributing the feed across its entire volume. The unique shape of the sidewalls 242a, 242b optimizes the feeding of settling tank 20 by eliminating localized flow accelerations and non-uniformities. Moreover, the peripheral geometries of inlets 241a, 241b enable the feedwell 240 to operate consistently and efficiently under a wide variety of flow conditions, slurry material properties, and feedwell sizes. While the feedwell inlets 241a, 241b are shown to be similar in size and shape, it is to be understood that inlets 241a, 241b may be differently-sized and/or shaped in order to handle different flow rates or different feed materials entering the same feedwell 240. A central region of the feedwell may be symmetrical and smaller in diameter than the non-cylindrical portions thereof. While not shown in FIGS. 12 and 13, lower central portions of feedwell 240 may comprise a cylindrical step or a spill lip 44 as shown in FIG. 4.

Figure 19A:
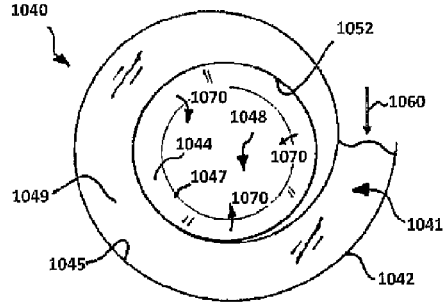
FIG. 19a schematically illustrates a top plan elevational profile of a feedwell according to some embodiments, comprising a peripheral sidewall surface defined by a portion of an Archimedean (i.e., arithmetic) spiral.
Figure 19B:
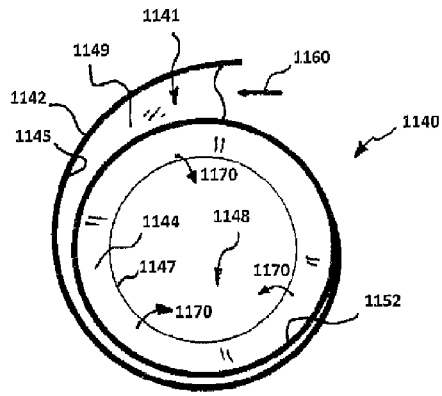
FIG. 19b schematically illustrates a top plan elevational profile of a feedwell according to some embodiments, comprising a peripheral sidewall surface defined by a portion of a Cornu (i.e., Euler, clothoid) spiral.
Figure 19C:
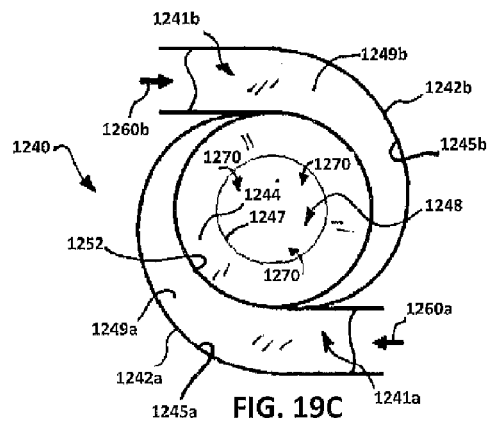
FIG. 19c schematically illustrates a top plan elevational profile of a feedwell according to some embodiments, comprising peripheral sidewall surfaces defined by portions of a Fermat's spiral.

It should be realized that while two feedwell inlet structures 241a, 241b are shown to extend in counter-rotating fashion, any number of feedwell inlets 241a, 241b may be provided, and inlets 241a, 241b may alternatively extend to support flows in the same rotational direction (e.g., FIG. 19c). In such cases, a feedwell inlet may be spaced from other feedwell inlets along a perimeter of the feedwell. For example, three feedwell inlets may be provided around a feedwell, wherein each inlet directs an influent stream into the feedwell in the same rotational direction. The inlets may be evenly spaced around the feedwell (e.g., 120 degrees apart), or the inlets may be spaced unevenly around the feedwell (e.g., 30-90-240 degrees apart, respectively). As shown in FIG. 19c, two inlets 1241a, 1241b may be spaced 180 degrees apart. Inlets 241a, 241b may be vertically displaced from one another along a central feedwell axis 253.

Figure 13:
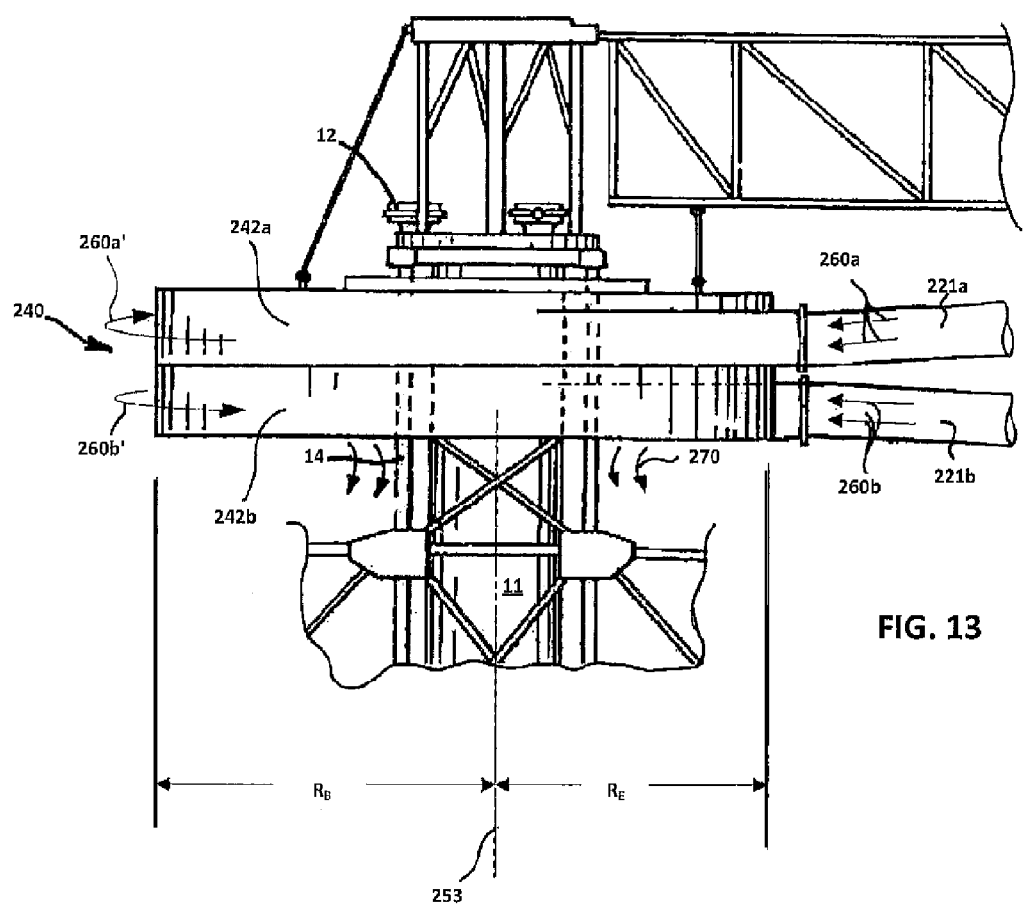
FIG. 13 shows a partial vertical sectional view of the thickener/clarifier unit of FIG. 12, taken on line in FIG. 12.

As depicted in FIG. 13, the feedwell 240 shown in FIG. 12 may be wider on a first side than on a second opposite side. For example, the feedwell 240 may be asymmetric, having a first quarter radius ($R_B$) that is larger than a third quarter radius ($R_E$). Also shown in FIG. 13 is an influent stream 260b flowing counter-clockwise 260b' around the feedwell 240 while another influent stream 260a flows clockwise 260a' around the feedwell 240 with respect to central axis 253.

Figure 14:
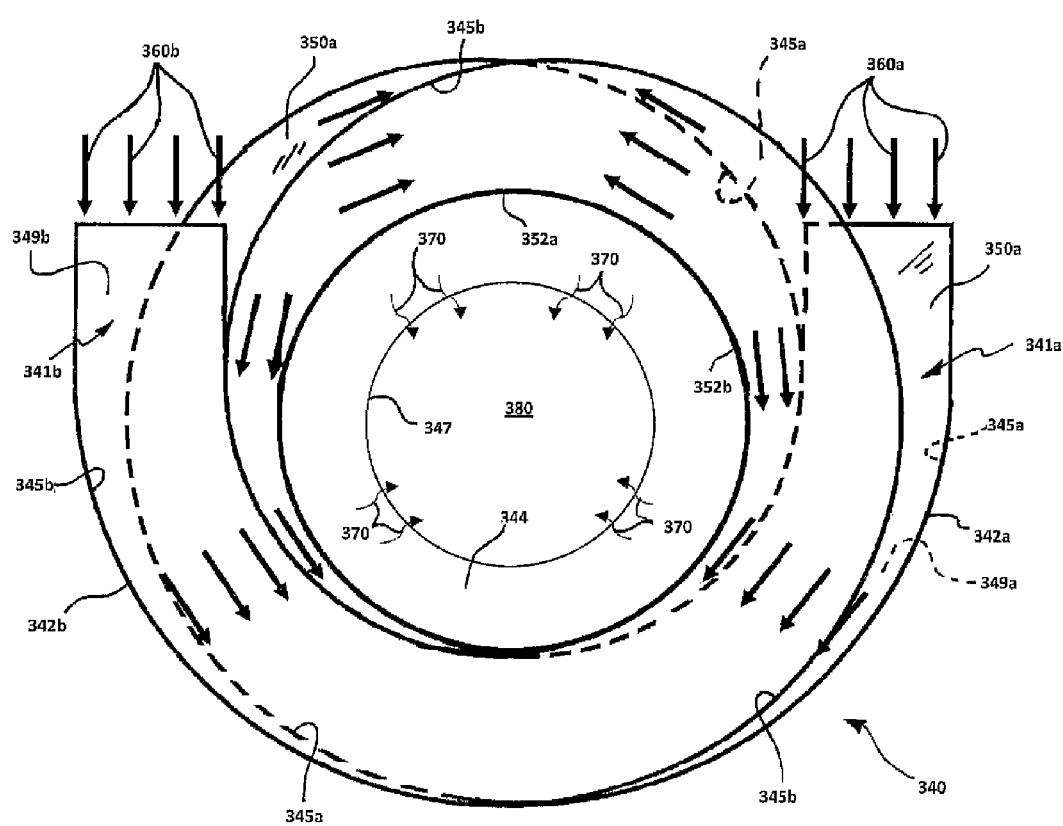
FIG. 14 schematically illustrates a top plan view of a Fitch-type feedwell according to some embodiments, wherein two opposing volute structures each extend approximately 450-degrees around the feedwell in juxtaposed, counter-rotating fashion.

FIG. 14 schematically illustrates a top plan view of a Fitch-type feedwell 340 according to some embodiments, wherein two or more opposing inlet structures 341a, 341b comprise curved sidewalls 342a, 342b extending 450 degrees around the feedwell 340. Sidewalls 342a, 342b may comprise a portion of a spiral, such as an Archimedean spiral as shown, and may crisscross to support counter-rotating flows.

Feedwell 340 may include a frustoconical spill lip 344 having an inner edge 347 that defines a discharge opening 348. In the embodiment shown, the inner edge 347 is shown to be circular for controlled egress of discharge 370. Each inlet structure 341a, 341b comprises a spiral-shaped shelf 349a, 349b that spans radially inwardly from its respective sidewall 345a, 345b to an inner edge 352a, 352b which is preferably circular. Shelves 349a, 349b may be vertically spaced along a central feedwell axis, and one or more inlet structures 341a may comprise an upper surface 350a to enclose the feedwell. Counter-rotating influent streams 360a, 360b meet in a zone of turbulence within the feedwell 340 adjacent inner edges 352a, 352b. The zone of turbulence is balanced by providing the curved, non-cylindrical surfaces to the inlet structures 341a, 341b.

Figure 15:
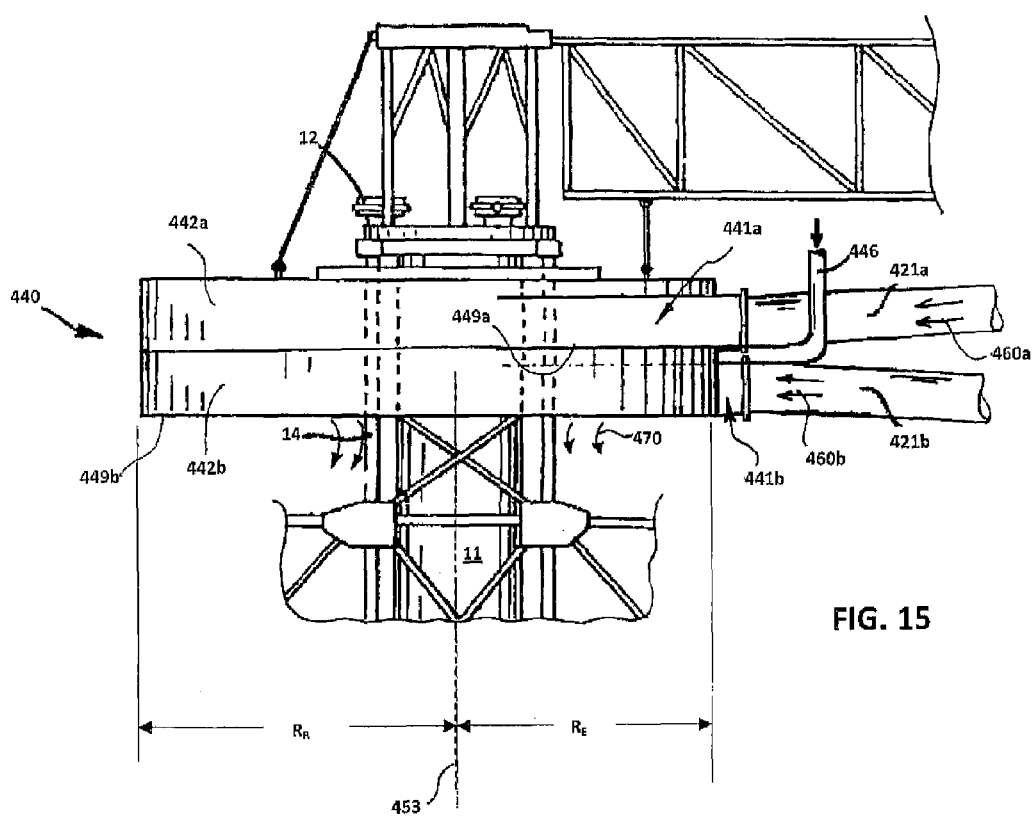
FIG. 15 shows a side view of a feedwell according to some embodiments, comprising two counter-rotating peripheral volute structures, each extending 360-degrees around the feedwell.

Turning now to FIG. 15, a feedwell 440 is provided for transferring infeed slurry 460a, 460b from infeed conduits 421a, 421b to a settling tank 20 (in a counter-rotating manner similar to the embodiments shown in FIGS. 13 and 14). The feedwell comprises sidewalls 442a, 442b having volute, helical, coil, spiral, compound curve, or spline curve surfaces. The feedwell 440 may further comprise one or more inlet ports 446 for introducing flocculant or dilutants into the feedwell 440 for mixing with counter-rotating slurry streams 460a, 460b as is done with DYNAFLOC® feedwell systems by FLSmidth, Inc. A small flocculant channel may be positioned axially between spiral shelves 449a, 449b within the feedwell 440, proximate the zone of turbulence and circular inner edges 447a, 447b of the spiral shelves 449a, 449b. The exiting mixture 470 leaves the feedwell 440 with a uniform fluid velocity distribution.

Figure 17:
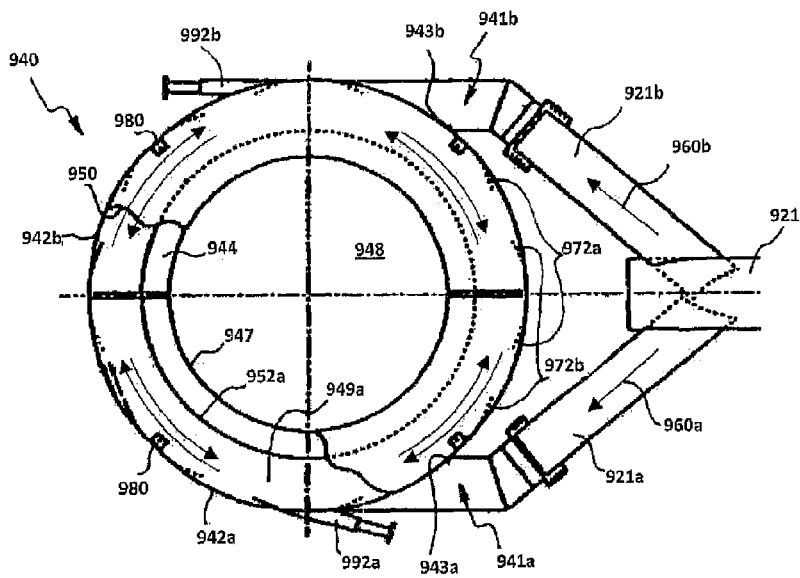
FIG. 17 shows a top plan elevational view of a conventional self-diluting feedwell comprising counter-rotating cylindrical peripheries extending 180-degrees around the feedwell.

FIG. 17 shows a conventional multiple dilution feedwell 940 such as one found in a DYNACHARGED™ dilution systems by FLSmidth, Inc. Feedwell 940 generally comprises a circular, cylindrical external periphery defined by sidewalls 942a, 942b forming portions of two inlets 941a, 941b. Inlets 941a, 941b are positioned on opposite sides of the feedwell 940, and are fed by two infeed conduits 921a, 921b which split from a main conduit 921. Influent feed streams 960a, 960b enter the feedwell 940 and flow in counter-rotating fashion within axially-displaced channels. Channels are defined by sidewalls 942a, 942b and one or more shelves 949a, 949b each shelf extending from the sidewalls 942a, 942b to an inner edge 952a, 952b. As the feed streams 960a, 960b merge within the feedwell 940 and mix together in a turbulent zone adjacent the annular edges 952a, 952b, flocculant is introduced into the feedwell 940 via one or more inlet ports 992a, 992b. The mixed fluid loses energy and non-uniformly exits the feedwell 940 through discharge opening 948. A lower spill lip 944 having a smaller diameter edge 947 than the inner edges 952a, 952b of shelves 949a, 949b may be provided according to some embodiments. Moreover, a lid surface 950 may be attached to upper portions of the feedwell 940 via mounts 980. Directional openings 972a, 972b may be provided along said channels so that clear dilutent fluid located in upper portions of the settling tank 20 can enter feedwell 940 (via momentum transfer or eduction) and mix with influent feed streams 960a, 960b as they move within the feedwell.

Figure 16:
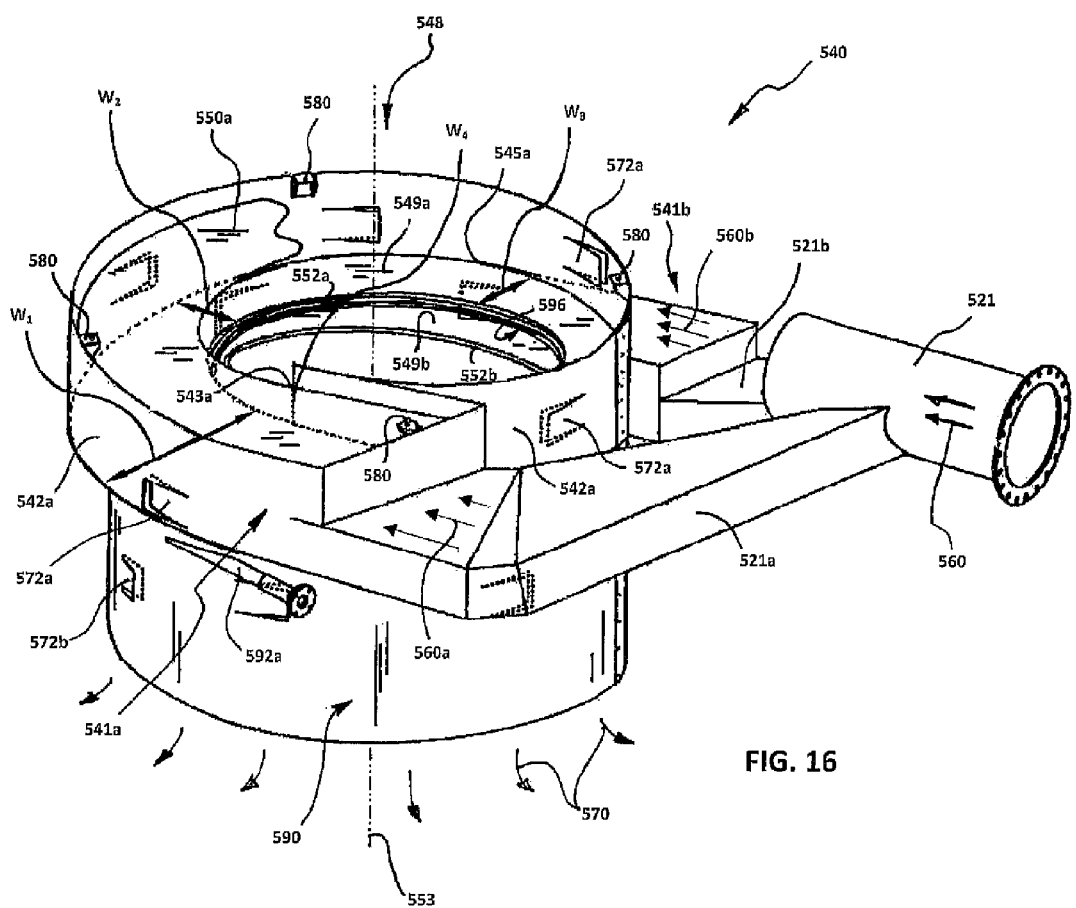
FIG. 16 shows a top isometric view of a self-diluting feedwell according to some embodiments, the feedwell comprising at least one flocculant infeed port, channel, or sparger between two counter-rotating volute structures extending 360-degrees around the feedwell.
Figure 18:
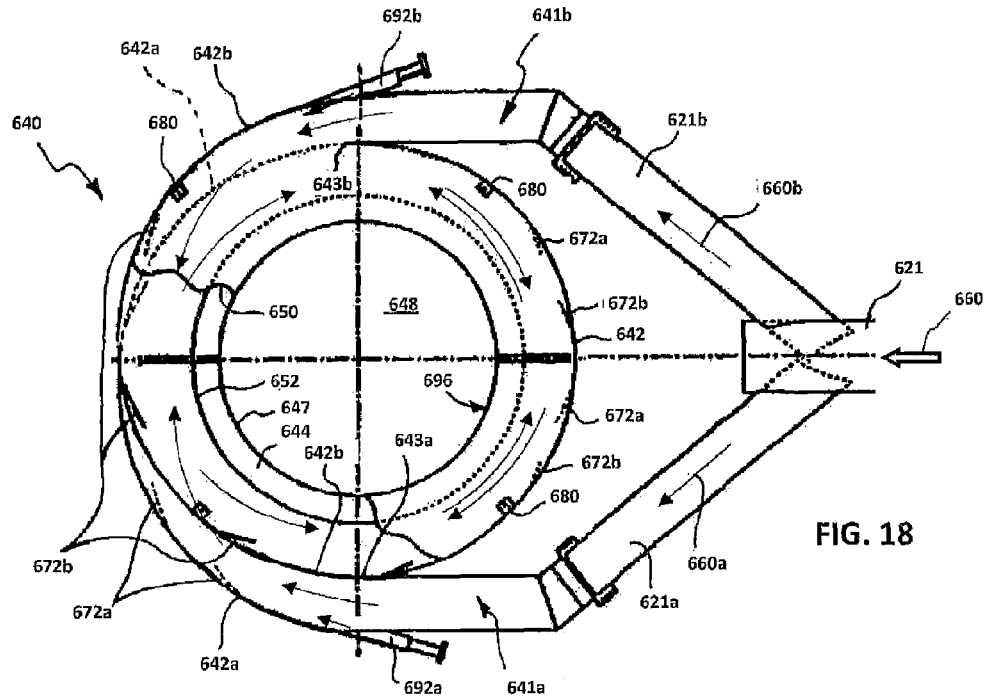
FIG. 18 shows a top plan elevational view of a self-diluting feedwell according to some embodiments, comprising counter-rotating peripheral volute structures extending 180-degrees around the feedwell.

FIGS. 16 and 18 show dilution feedwells 540, 640 incorporating 360-degree volute inlet structures and 180-degree volute inlet structures, respectively.

Turning to FIG. 16, feedwell 540 comprises curved sidewalls 542a, 542b which form portions of inlets 541a, 541b. The sidewalls 542a, 542b are non-cylindrical and comprise volute, spiral, helical, coiled, spline curve, or compound curve surfaces. Sidewalls 542a, 542b provide outermost peripheral fluid boundary surfaces which create uniform flow distributions 570 within the feedwell and around the discharge opening 548. The curved sidewalls 542a, 542b extend approximately 360 degrees around the feedwell 540. One or more directional openings 572a, 572b may be provided within sidewalls 542a, 542b so that clear dilutent fluid located in upper portions of the settling tank 20 may enter feedwell 540 (e.g., via momentum transfer or eduction) and mix with influent feed streams 560a, 560b as they move within the feedwell 540. Inlets 541a, 541b may be positioned on opposite sides of the feedwell 540 as shown, and may be fed by two infeed conduits 521a, 521b which split from a main conduit 521. Influent feed streams 560a, 560b enter the feedwell 540 at radially-outermost portions of the inlets 541a, 541.b and flow in counter-rotating fashion within axially-displaced circumferential channels.

Channels are defined by sidewalls 542a, 542b and one or more shelves 549a, 549h each extending from said sidewalls 542a, 542b to an annular inner edge 552a, 552b. The width of each shelf 549a, 549b is initially large where incoming slurry 560a, 560b enters the feedwell 540, but gradually becomes smaller as the shelves extend around the feedwell. For example, as feed streams 560a, 560b merge within the feedwell 540 and mix together, shelves 549a, 549b decrease in width, wherein $w_1 > w_2 > w_3 > w_4$. In the embodiment shown, $w_4 = 0$ at or proximate to point of intersection 543a. Flocculant may be introduced into the feedwell 540 via one or more inlet ports 592a, and may flow within a small flocculant distribution channel 596 located between said shelves 549a, 549b. A turbulent zone is formed adjacent the annular edges 552a, 552b of the shelves 549a, 549b and around the flocculant distribution channel 596, allowing flocculant to bind to suspended particulate. Mixed fluid loses energy and eventually exits the feedwell 540 uniformly through opening 548. A spill lip (not shown) having a smaller diameter than edges 552a, 552b may be provided. Moreover, a lid surface 550 may be attached to upper portions of the feedwell 540 via mounts 580 to enclose the feedwell.

Turning now to FIG. 18, feedwell 640 generally comprises curved sidewalk 642a, 642b forming portions of two inlets 641a, 641b. Sidewalls 642a, 642b are non-cylindrical, and may comprise volute, spiral, helical, spline curve, or coil-shaped surfaces in order to create uniform flow distributions 670 within the feedwell and around opening 648. The sidewalls 642a, 642b extend approximately 180 degrees around the feedwell 640. One or more directional openings 672a, 672b may be provided in the sidewalls 642a, 642b so that clear dilutent fluid located in upper portions of the settling tank 20 may enter feedwell 640 (via momentum transfer or eduction) and mix with influent streams 660a, 660b. Inlets 641a, 641b are positioned on opposite sides of the feedwell 640, and are fed by two infeed conduits 621a, 621b which split from a main conduit 621. Influent streams 660a, 660b enter the feedwell 640 at radially-outermost portions of the inlets 641a, 641b and flow in counter-rotating fashion within axially-displaced channels.

Channels are defined by sidewalls 642a, 642b and one or more shelves 649a, 649b which extend from the sidewalls 642a, 642b to an inner edge 652a, 652b. The widths of the shelves 649a, 649b are large where incoming slurry 660a, 660b enters the feedwell 640, but the widths of the shelves gradually become smaller as they extend around the feedwell. In the embodiment shown, the widths of shelves 649a, 649b decrease between the inlets 641a, 649b and points of intersection 643a, 6436, at which point the widths of shelves 649a, 649b remain constant. In some embodiments, the shelves 649a, 649b may stop abruptly prior to or after reaching point of intersection 643a. Flocculant may be introduced into the feedwell 640 via one or more inlet ports 692a, and may flow within a small flocculant distribution channel 696 located between the counter-rotating streams 660a, 660b. A turbulent zone is formed near the annular inner edges 652a, 652b of the shelves 649a, 649b and around the flocculant distribution channel 696, allowing the flocculant to bind to suspended particulate. Mixed fluid loses energy and eventually exits the feedwell 640 uniformly through opening 648. A lower spill lip 644 having a smaller diameter inner edge 647 than the inner edges 652a, 652b may be provided. Moreover, a lid surface 650 may be attached to upper portions of the feedwell 640 via mounts 680 to provide an enclosed feedwell.

Figure 19D:
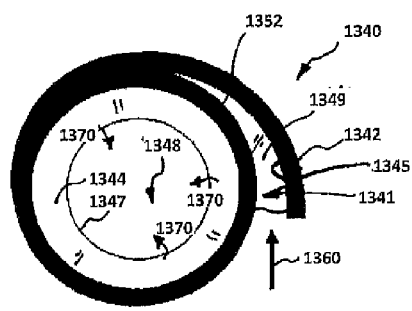
FIG. 19d schematically illustrates a top plan elevational profile of a feedwell according to some embodiments, comprising a peripheral sidewall surface defined by a portion of a hyperbolic spiral.
Figure 19E:
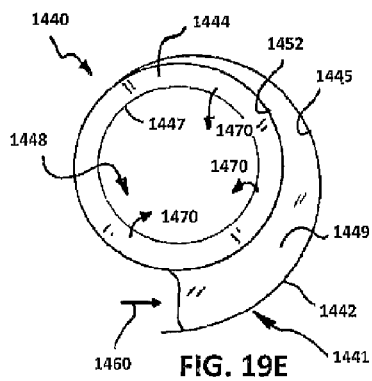
FIG. 19e schematically illustrates a top plan elevational profile of a feedwell according to some embodiments, comprising a peripheral sidewall surface defined by a portion of a Lituus spiral.
Figure 19F:
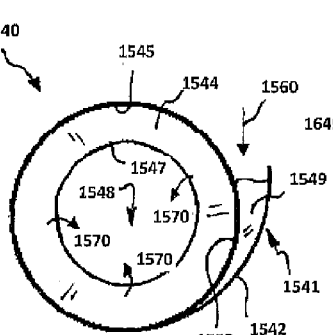
FIG. 19f schematically illustrates a top plan elevational profile of a feedwell according to some embodiments, comprising a peripheral sidewall surface defined by a portion of a logarithmic spiral.
Figure 19G:
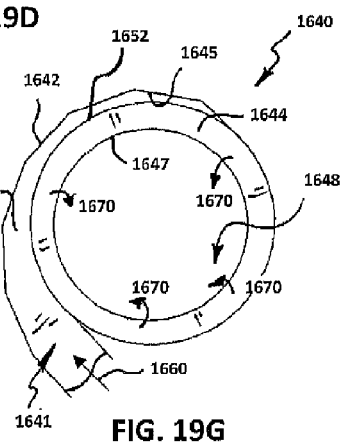
FIG. 19g schematically illustrates a top plan elevational profile of a feedwell according to some embodiments, comprising a peripheral sidewall surface defined by a portion of a Spiral of Thodorus.
Figure 20:
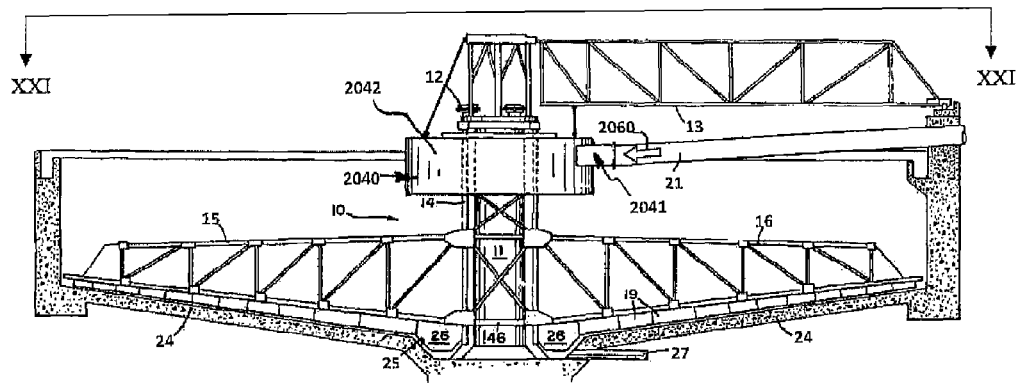
FIGS. 20-21 show a sedimentation thickener/clarifier unit incorporating a conventional tangential-feed cylindrical feedwell according to some embodiments.
Figure 21:
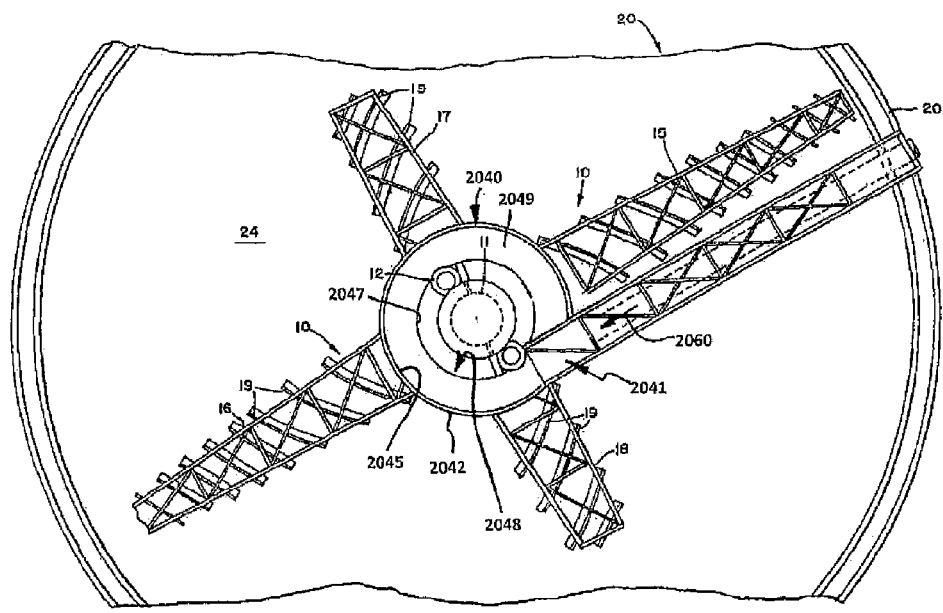

FIGS. 19a-19g schematically illustrate top plan views of feedwells having various profile geometries according to the invention. FIG. 19a suggests a feedwell 1040 having a peripheral sidewall surface 1042 comprising a portion of an Archimedean spiral, FIG. 19b suggests a feedwell 1140 having a peripheral sidewall surface 1142 comprising a portion of a Cornu spiral, FIG. 19c suggests a feedwell 1240 having a peripheral sidewall surface 1242 comprising a portion of an Fermat's spiral. FIG. 19d suggests a feedwell 1340 having a peripheral sidewall surface 1342 comprising a portion of a hyperbolic spiral, FIG. 19e suggests a feedwell 1440 having a peripheral sidewall surface 1442 comprising a portion of an Lituus spiral, FIG. 19f suggests a feedwell 1540 having a peripheral sidewall surface 1542 comprising a portion of a logarithmic spiral, FIG. 19g suggests a feedwell 1640 having a peripheral sidewall surface 1642 comprising a portion of an Spiral of Thodorus, which can be manufactured by welding or otherwise attaching individual plates together to approximate a curved surface.

Each feedwell 1040, 1140, 1240, 1340, 1440, 1540, 1640 comprises a non-cylindrical inlet 1041, 1141, 1241, 1341, 1441, 1541, 1641 having a spiral-shaped shelf 1049, 1149, 1249, 1349, 1449, 1549, 1649 extending from an outer edge 1045, 1145, 1245, 1345, 1445, 1545, 1645 intersecting a sidewall 1042, 1142, 1242, 1342, 1442, 1542, 1642 to an inner edge 1052, 1152, 1252, 1352, 1452, 1552, 1652. The inner edge defines an outer perimeter of an optional spill lip 1044, 1144, 1244, 1344, 1444, 1544, 1644 having an inner edge 1047, 1147, 1247, 1347, 1447, 1547, 1647 which defines a discharge opening 1048, 1148, 1248, 1348, 1448, 1548, 1648 for egress of an effluent stream 1070, 1170, 1270, 1370, 1470, 1570, 1670. The spill lip may be flat, sloped, stepped, rounded, or frustoconical without limitation. The inlet 1041, 1141, 1241, 1341, 1441, 1541, 1641 is located at an outer periphery of the feedwell such that the infeed stream 1060, 1160, 1260, 1360, 1460, 1560, 1660 is initially located at a greater radial distance from the feedwell center than the effluent stream 1070, 1170, 1270, 1370, 1470, 1570, 1670.

Figure 25:
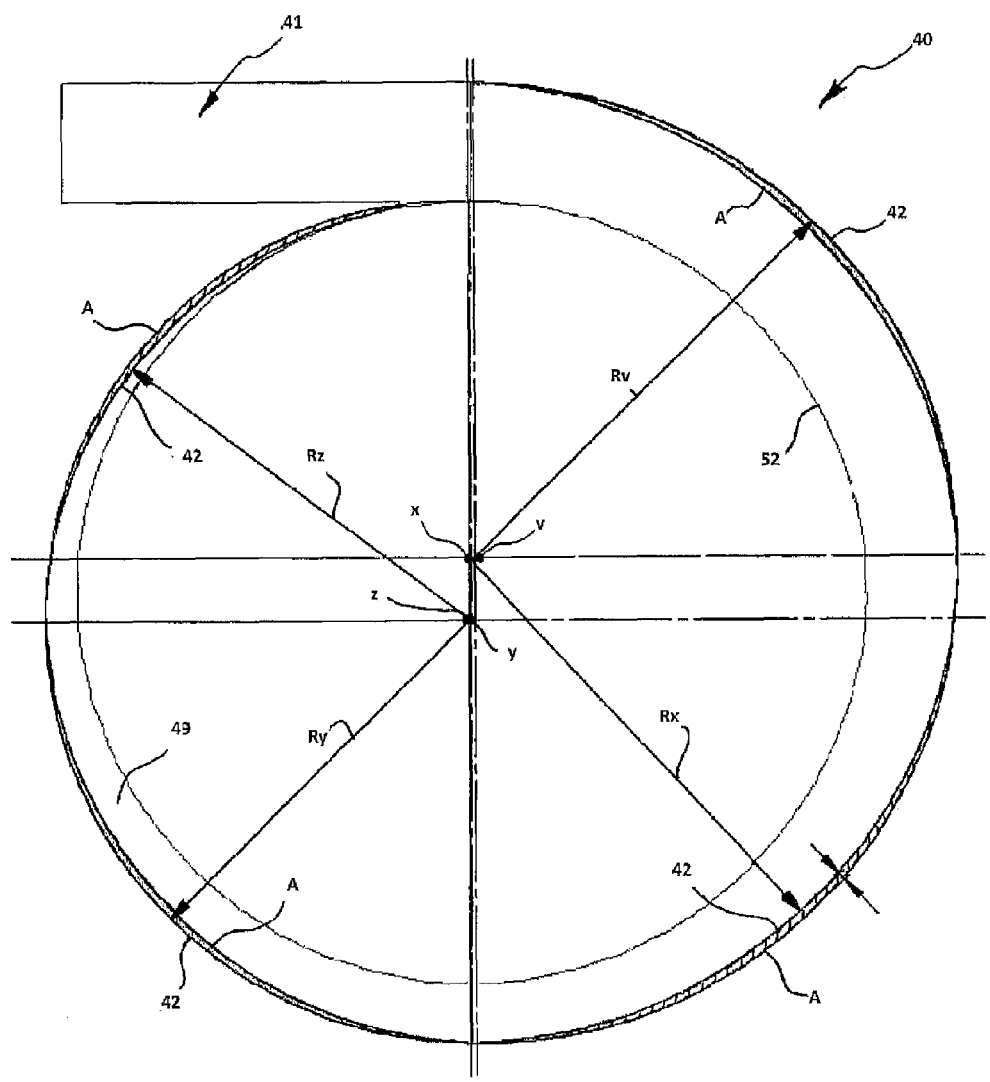
FIG. 25 illustrates a feedwell according to some embodiments incorporating a sidewall defined by a compound curve defined by a plurality of arc segments arranged in series.
Figure 26:
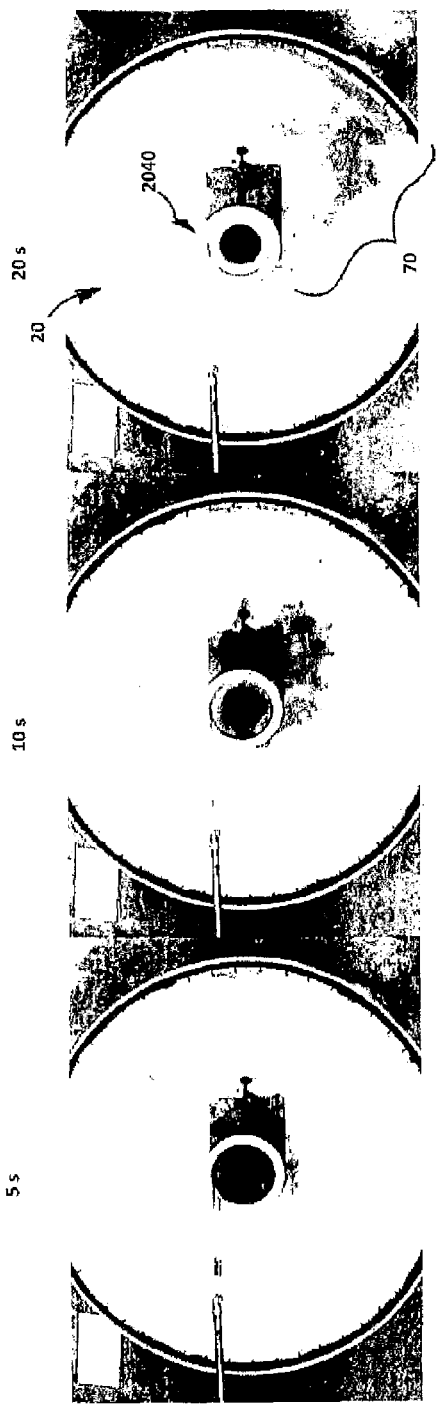
FIGS. 26 and 27 show time lapse photos of scaled down dye tests performed at a flow rate of approximately 0.04 cubic meters per hour (m$^3$/h)

Sidewalls may have compound curve shapes which provide cost benefits, as well as ease of manufacture. FIG. 25 illustrates a sidewall 42 comprising a compound curve shape, wherein the compound curve is defined by a plurality of arc segments having different radii $R_y$, $R_x$, $R_y$, $R_z$, and/or different origins v, x, y, z. In the particular embodiment shown, four arc segments are used to approximate an arithmetic (i.e., Archemedean) spiral, which is labeled "A" in the drawings. The solid areas represent regions where a compound curve may extend radially-beyond a true arithmetic spiral A. The hatched areas represent regions where a true arithmetic spiral A may extend radially-beyond a compound curve.

Figure 27:
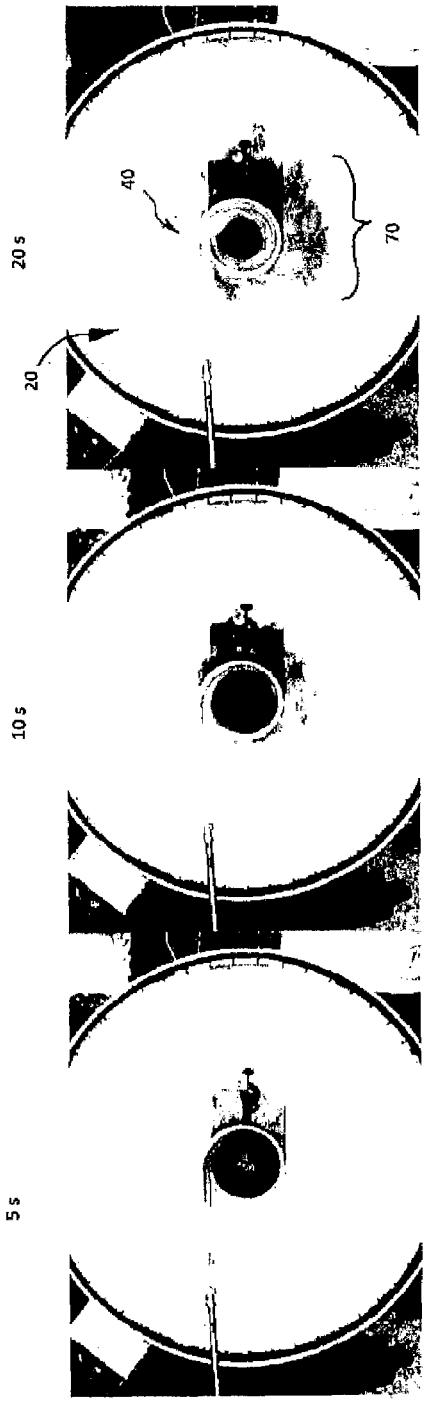
Figure 28:
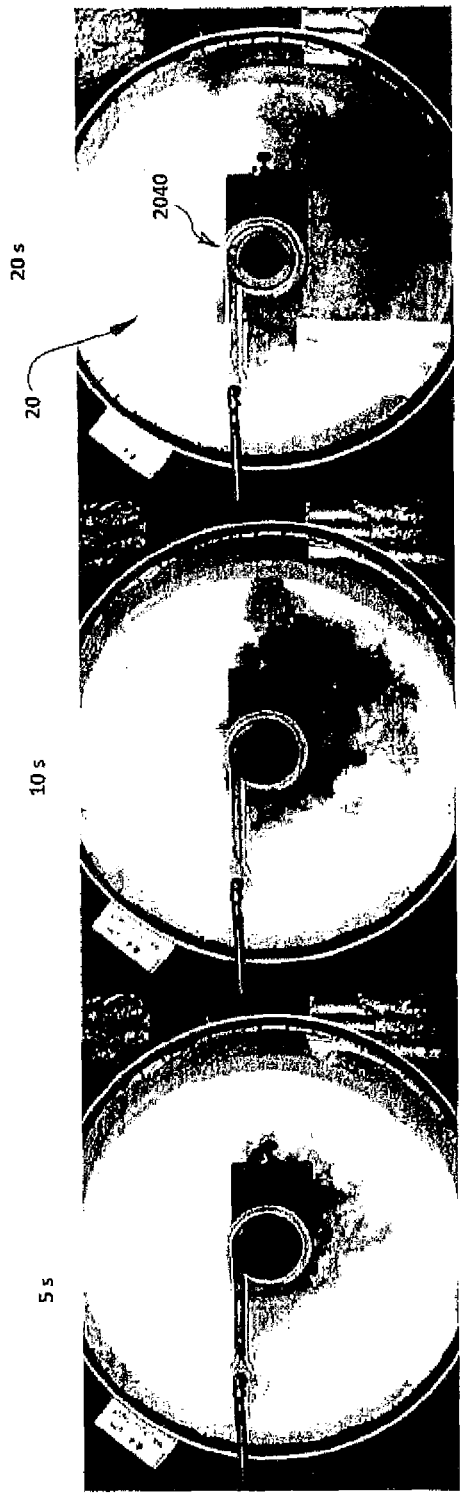
FIGS. 28 and 29 show time lapse photos of scaled down dye tests performed at a flow rate of approximately 0.09 cubic meters per hour (m$^3$/h)
Figure 29:
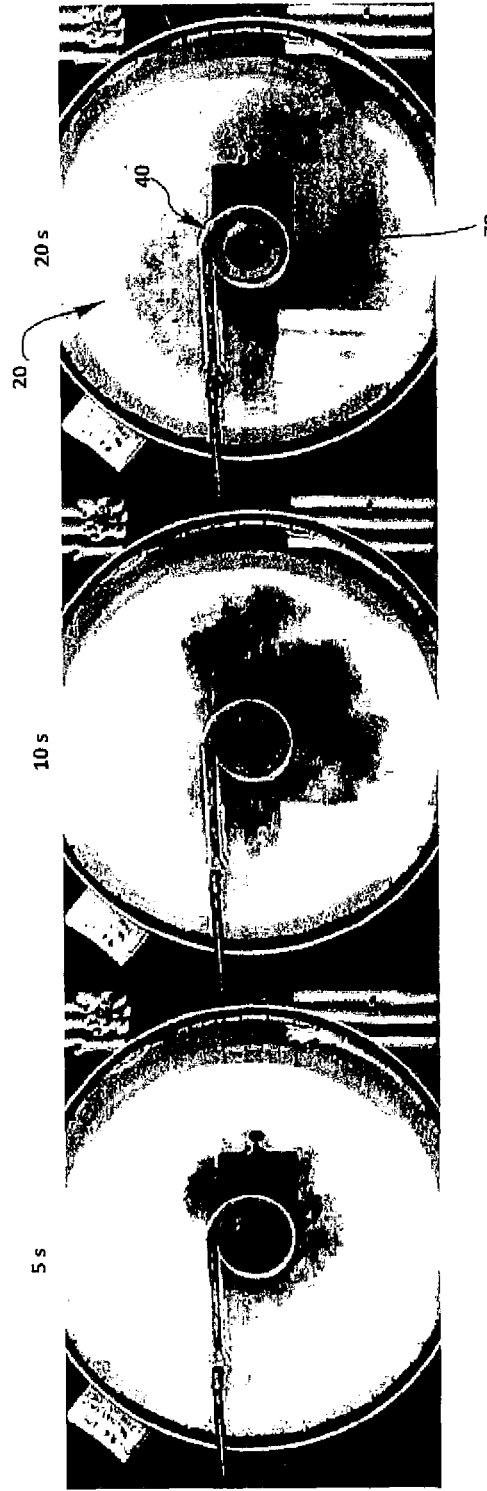

FIGS. 27 and 29 demonstrate that more uniform radial flows are achieved using feedwells according to the invention. The figures show time-lapse photos taken from scaled down bench dye-tests. The photos were taken at 5 second, 10 second, and 20 second intervals, from left to right, respectively. As shown in FIG. 27, at a flow rate of approximately 0.04 cubic meters per hour ($m^3/h$), discharge 70 generally moves evenly within all four quadrants of settling tank 20. Similarly, as shown in FIG. 29, at a flow rate of approximately 0.09 cubic meters per hour ($m^3/h$), discharge 70 generally moves evenly within all four quadrants of settling tank 20. The distribution of the discharge 70 around the tank is even, and therefore, precipitated solids can be removed from the center of the tank 20 more quickly without risk of overloading rake drive mechanism 12.

Figure 30:
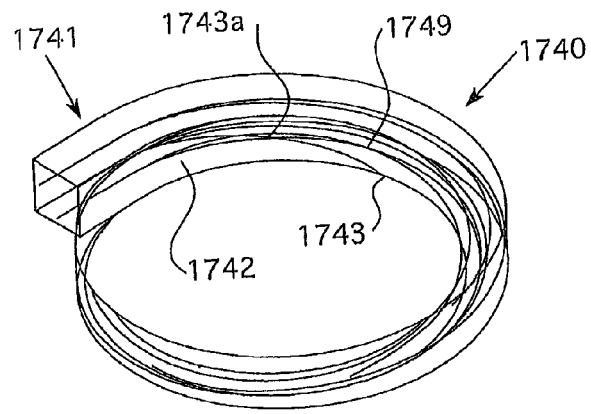
FIGS. 30 and 31 show alternative feedwells comprising an extended sidewalk having varying points of intersection.
Figure 31:
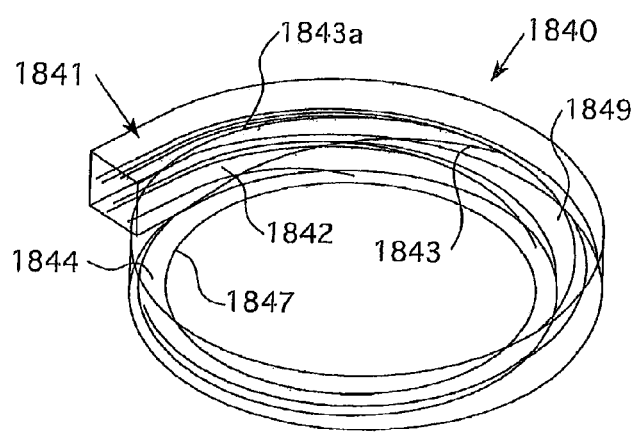

In some instances, as shown in FIGS. 30 and 31, points of intersection 1783, 1843 may extend well beyond inlet 1781, 1881. A sidewall 1742 may comprise a gradual slope 1743a which eventually meets with an inner edge of a shelf 1749. Alternatively, a sidewall 1842 may comprise a gradual slope 1843a which eventually meets with a middle surface portion of a shelf 1849 or spill lip 1844. It should be known that while not shown, shelf 1749 need not terminate in width at point of intersection 1783. Rather, shelf 1749 may be annular and comprise at least some width around the entire feedwell 1749.

A contractor or other entity may provide a sedimentation system including a feedwell system shown in the figures. For instance, the contractor may receive a bid request for a project related to designing a system for diluting an influent feed stream, or the contractor may offer to design such a system. The contractor may then provide a feedwell system, for example, one including any one or more of the features shown and described in the embodiments of the system discussed above. The contractor may provide such devices by selling those devices or by offering to sell those devices. The contractor may provide various embodiments that are sized and configured to meet the design criteria of a particular client or customer. The contractor may subcontract the fabrication, delivery, sale, or installation of a component of any of the devices or of other devices used to provide such devices. The contractor may also survey a site and design or designate one or more storage areas for stacking the material used to manufacture the devices. The contractor may also maintain, modify, or upgrade the provided devices. The contractor may provide such maintenance or modifications by subcontracting such services or by directly providing those services, and in some cases, the contractor may modify an existing system with a "retrofit kit" to arrive at a modified system comprising one or more features of the systems discussed herein.

Although the invention has been described in terms of particular embodiments and applications, one of ordinary skill in the art, in light of this teaching, can generate additional embodiments and modifications without departing from the spirit of or exceeding the scope of the claimed invention. It is believed that the invention would be useful in virtually any type of feedwell, with or without the addition of flocculant, with or without slurry dilution by eduction, with singular or multiple infeed paths, and with or without spill lips or shelves, etc. Furthermore, the invention could be practiced by curving the infeed conduit itself, such that it is configured and constructed to function similarly to the volute sidewalls described herein. Additionally, shelves and spill lips defined herein may extend anywhere between 0 and 360 degrees around the feedwells shown and described, and may have at least some width around the entire feedwell so as to be a spiral-shaped annulus. Moreover, the invention could be used with, or made a part of, conventional feedwell assemblies by way of retrofit kits for modifying conventional cylindrical feedwells for subsequent attachment of the volute inlet structures, sidewalls, and geometries discussed herein. Moreover, the feedwells described herein may be used in combination with other known improvements such as an FLSmidth E-DUC® feedwell dilution system. Accordingly, it is to be understood that the drawings and descriptions herein are proffered by way of example to facilitate comprehension of the invention and should not be construed to limit the scope thereof.

What is claimed is:

1. A feedwell for a thickener/clarifier, said feedwell comprising:
    a feedwell body (40);
    a sidewall (42) defining a radially-outermost fluid boundary surface of the feedwell, the sidewall (42) comprising at least one of a volute surface, a helical surface, a coil surface, a compound curve surface, a spline curve surface, or a spiral surface;
    a feedwell inlet (41) for directing an influent stream (60) to the feedwell along the sidewall (42);
    a discharge opening (48) for passing fluids and solids from the feedwell to a settling tank (20);
    a shelf (49) extending radially-inwardly from the sidewall (42) from an outer edge (45) to an inner edge (52) which is adjacent the discharge opening (48); wherein a width of the shelf (49) changes as the shelf (49) extends along the sidewall (42); and,
    a spill lip (44) extending radially-inwardly from the inner edge (52) of the shelf (49), and further surrounding and effectively reducing the size of the discharge opening (48).

2. A feedwell according to claim 1, wherein the shelf (49) terminates at a point of intersection (43) where the outer edge (45) intersects the inner edge (52).

3. A feedwell according to claim 1, wherein said shelf (49) extends circumferentially for approximately 90, 180, 270, or 360 degrees of angular rotation about a central axis (53) of the feedwell.

4. A feedwell according to claim 1, further comprising one or more flow control structures (172) selected from the group consisting of: fins, vanes, stators, rotors, rotor blades, free-spinning paddle wheels, straight blades, curved blades, ribs, channels, baffles, screens, and shaped panels.

5. A feedwell according to claim 1, wherein said sidewall is one of a plurality sidewalls (242a, 242b; 342a, 342b; 442a, 442b; 542a, 542b; 642a, 642b) which are configured to support counter-rotating flows (260a, 260b; 360a, 360b; 460a, 460b; 560a, 560b; 660a, 660b) with respect to a central axis (53) of the feedwell.

6. A feedwell according to claim 1, wherein said sidewall is one of a plurality of sidewalls (1242a, 1242b) which are configured to support flows (1260a, 1260b) which rotate in the same rotational direction with respect to a central axis (53) of the feedwell.

7. A feedwell according to claim 1, further comprising one or more inlet ports (46; 446; 592a, 592b; 692a, 692b; 992a, 992b) for introducing flocculant.

8. A feedwell according to claim 1, wherein the shape of the sidewall (42) comprises a portion of an Archimedean spiral, a Cornu spiral, a Fermat spiral, a hyperbolic spiral, a Lituus spiral, a logarithmic spiral, a transition spiral, or a spiral of Thodorus.

9. A feedwell according to claim 1, wherein a radial distance between the sidewall (42) and a central axis (53) of the feedwell changes as a function of angle of rotation about said central axis (53).

10. A feedwell according to claim 9, wherein said change of radial distance between the sidewall (42) and the central axis (53) with respect to angle of rotation about said central axis (53) is constant.

11. A feedwell according to claim 9, wherein said change of radial distance between the sidewall (42) and the central axis (53) with respect to angle of rotation about said central axis (53) is not constant.

12. A feedwell according to claim 1, wherein the spill lip (44, 144, 344, 644, 1044, 1144, 1244, 1344, 1444, 1544, 1644) is flat, sloped, stepped, rounded, or frustoconical.

13. A feedwell for a thickener/clarifier according to claim 1, wherein the sidewall (542a, 542b; 642a, 642b) comprises at least one opening (572a, 572b; 672a, 672b) to assist with the dilution of said influent stream (560, 660).

14. A kit for modifying a conventional feedwell (2040, 2140) in a sedimentation system, the feedwell including a circular or cylindrical radially-outermost fluid boundary surface (2042, 2142); said kit comprising:
    a sidewall (42) for replacing the circular or cylindrical radially-outermost fluid boundary surface (2042, 2142) of the feedwell (2040, 2140), the sidewall (42) comprising at least one of a volute surface, a helical surface, a coil surface, a compound curve surface, a spline curve surface, or a spiral surface;
    a shelf (49) for extending radially-inwardly from the sidewall (42) from an outer edge (45) to an inner edge (52) which is adjacent a discharge opening (48); wherein a width of the shelf (49) changes as the shelf (49) extends along the sidewall (42); and,
    a spill lip (44) extending radially-inwardly from the inner edge (52) of the shelf (49), and further surrounding and effectively reducing the size of the discharge opening (48).

15. A feedwell kit according to claim 14, further comprising one or more flow control structures (172) selected from the group consisting of: fins, vanes, stators, rotors, rotor blades, free-spinning paddle wheels, straight blades, curved blades, ribs, channels, baffles, screens, and shaped panels.

16. A feedwell kit according to claim 14, wherein the sidewall (542a, 542b; 642a, 642b) comprises at least one opening (572a, 572b; 672a, 672b) to assist with the dilution of an influent stream (560, 660).

17. A feedwell kit according to claim 14, further comprising one or more inlet ports (46; 446; 592a, 592b; 692a, 692b; 992a, 992b) for introducing flocculant.

18. A feedwell kit according to claim 14, wherein the shape of the sidewall (42) comprises a portion of an Archimedean spiral, a Cornu spiral, a Fermat spiral, a hyperbolic spiral, a Lituus spiral, a logarithmic spiral, a transition spiral, or a spiral of Thodorus.

19. A feedwell kit according to claim 14, wherein the shelf (49) is configured to extend for approximately 90, 180, 270, or 360 degrees of angular rotation around the feedwell (2040, 2140).

20. A feedwell kit according to claim 14, wherein the shelf (49) terminates at a point of intersection (43) where the outer edge (45) intersects the inner edge (52).

21. A feedwell kit according to claim 14, wherein the shortest distance between the outer edge (45) of the shelf (49) and the inner edge (52) of the shelf (49) changes as a function of position along the sidewall (42).

22. A method of improving the efficiency of a sedimentation system, the method comprising the steps of:

providing a feedwell body (40); a sidewall (42) defining a radially-outermost fluid boundary surface of the feedwell, the sidewall (42) comprising at least one of a volute surface, a helical surface, a coil surface, a compound curve surface, a spline curve surface, or a spiral surface; a feedwell inlet (41) for directing an influent stream (60) to the feedwell along the sidewall (42); and a discharge opening (48) for passing fluids and solids from the feedwell to a settling tank (20);

providing a shelf (49) extending radially-inwardly from the sidewall (42) from an outer edge (45) to an inner edge (52) which is adjacent the discharge opening (48); wherein a width of the shelf (49) changes as the shelf (49) extends along the sidewall (42);

providing a spill lip (44) extending radially-inwardly from the inner edge (52) of the shelf (49), and further surrounding and effectively reducing the size of the discharge opening (48);

flowing an influent stream (60) through said feedwell inlet (41); and, by virtue of the shape, configuration, and disposition of said sidewall (42), reducing the number of areas of high localized fluid accelerations (2082) and high localized fluid velocities (2074, 2084, 2102, 2176, 2174) within and around the discharge opening (48) of the feedwell.

\* \* \* \* \*